(12) United States Patent
Ramakrishnan et al.

(10) Patent No.: US 11,339,263 B2
(45) Date of Patent: May 24, 2022

(54) FIBRILLATED POLYMER COMPOSITIONS AND METHODS OF THEIR MANUFACTURE

(71) Applicant: SHPP GLOBAL TECHNOLOGIES B.V., Bergen op Zoom (NL)

(72) Inventors: Vaidyanath Ramakrishnan, Bergen op Zoom (NL); Satish Kumar Gaggar, Hoover, AL (US); Malvika Bihari, Evansville, IN (US); Frederico Marques Ferreira Custodio, Leiria (PT); Johannes Martinus Dina Goossens, Bergen op Zoom (NL)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 16/518,068

(22) Filed: Jul. 22, 2019

(65) Prior Publication Data
US 2019/0338098 A1    Nov. 7, 2019

Related U.S. Application Data

(62) Division of application No. 15/556,690, filed as application No. PCT/US2016/022688 on Mar. 16, 2016, now Pat. No. 10,400,080.

(60) Provisional application No. 62/133,520, filed on Mar. 16, 2015.

(51) Int. Cl.
| | |
|---|---|
| *C08J 9/00* | (2006.01) |
| *C08L 55/02* | (2006.01) |
| *C08L 67/02* | (2006.01) |
| *C08L 23/10* | (2006.01) |
| *C08J 9/14* | (2006.01) |
| *C08L 77/00* | (2006.01) |
| *C08L 25/12* | (2006.01) |
| *C08L 27/18* | (2006.01) |
| *C08L 27/20* | (2006.01) |
| *C08L 65/00* | (2006.01) |

(52) U.S. Cl.
CPC .......... *C08J 9/0085* (2013.01); *C08J 9/0061* (2013.01); *C08J 9/141* (2013.01); *C08L 23/10* (2013.01); *C08L 25/12* (2013.01); *C08L 27/18* (2013.01); *C08L 27/20* (2013.01); *C08L 55/02* (2013.01); *C08L 67/02* (2013.01); *C08L 77/00* (2013.01); *C08G 2261/1424* (2013.01); *C08G 2261/3221* (2013.01); *C08G 2261/3223* (2013.01); *C08G 2261/512* (2013.01); *C08G 2261/794* (2013.01); *C08J 2203/14* (2013.01); *C08J 2367/02* (2013.01); *C08J 2427/18* (2013.01); *C08L 65/00* (2013.01)

(58) Field of Classification Search
CPC ....... C08L 23/10–147; C08L 27/12–20; C08L 51/003; C08L 51/06; C08L 27/22
See application file for complete search history.

(56) References Cited

U.S. PATENT DOCUMENTS

| | | |
|---|---|---|
| 3,853,690 A | 12/1974 | McGarry et al. |
| 4,154,775 A | 5/1979 | Axelrod |
| 4,223,100 A | 9/1980 | Reinert |
| 4,396,693 A | 8/1983 | Bernstein et al. |
| 4,579,906 A | 4/1986 | Zabrocki et al. |
| 4,810,381 A | 3/1989 | Hagen et al. |
| 4,810,739 A | 3/1989 | Lindner et al. |
| 4,842,369 A | 6/1989 | Teshima et al. |
| 4,914,156 A | 4/1990 | Howe |
| 4,923,737 A | 5/1990 | De La Torre |
| 4,966,941 A | 10/1990 | Subramanian |
| 5,030,403 A | 7/1991 | Pickens et al. |
| 5,093,110 A | 3/1992 | Kamen et al. |
| 5,120,778 A | 6/1992 | Price et al. |
| 5,124,377 A | 6/1992 | Price et al. |
| 5,209,958 A | 5/1993 | Katsaros et al. |
| 5,258,432 A | 11/1993 | Ogoe et al. |
| 5,326,355 A | 7/1994 | Landi |
| 5,393,819 A | 2/1995 | Peters |
| 5,399,598 A | 3/1995 | Peters |
| 5,418,270 A | 5/1995 | Peters |
| 5,476,589 A | 12/1995 | Bacino |
| 5,639,372 A | 6/1997 | Hagen et al. |
| 5,645,603 A | 7/1997 | Peters |
| 5,679,741 A * | 10/1997 | Breton .................. C08F 259/08 525/199 |
| 5,702,610 A | 12/1997 | Hagen et al. |

(Continued)

FOREIGN PATENT DOCUMENTS

| | | |
|---|---|---|
| AU | 2660997 A | 10/1998 |
| CA | 1304188 C | 6/1992 |

(Continued)

OTHER PUBLICATIONS

Kinga Jurczuk et al., Strain Hardening of Molten Thermoplastic Polymers Reinforced With Poly(tetrafluoroethylene) Nanofibers; J. Rheol. 58, 589 (2014).
Hideyuki, Otsuka; "Reorganization of polymer structures based on dynamic covalent chemistry: polymer reactions by dynamic covalent exchanges of alkoxyamine units"; Polymer Journal; vol. 45; 2013; p. 879-891.
Bowman et al.; "Covalent Adaptable Networks: Reversible Bond Structures Incorporated in Polymer Networks"; Angewandte Chemical Int.; vol. 51; 2012; p. 4272-4274.
International Patent Application No. PCT/US2016/022688; Int'l Search Report and the Written Opinion; dated Jun. 15, 2016; 12 pages.

(Continued)

*Primary Examiner* — Ana L. Woodward
(74) *Attorney, Agent, or Firm* — Quicker Law, LLC

(57) ABSTRACT

The disclosure is directed to polymer compositions comprising a matrix polymer component comprising a crystalline or semi-crystalline polymer; and a fibrillated fluoropolymer, a fibrillated fluoropolymer encapsulated by an encapsulating polymer, or a combination thereof. Methods of preparing and using these polymer compositions, as well as articles comprising the polymer compositions, as also described.

20 Claims, 6 Drawing Sheets

(56) References Cited

U.S. PATENT DOCUMENTS

| | | |
|---|---|---|
| 5,804,654 A | 9/1998 | Lo et al. |
| 5,866,058 A | 2/1999 | Batchelder et al. |
| 5,866,256 A | 2/1999 | Izumitani et al. |
| 5,879,791 A | 3/1999 | Kato et al. |
| 5,947,918 A | 9/1999 | Jones et al. |
| 5,962,587 A | 10/1999 | Gaggar et al. |
| 5,968,561 A | 10/1999 | Batchelder et al. |
| 6,040,370 A | 3/2000 | Wozny et al. |
| 6,127,465 A | 10/2000 | Nodera |
| 6,199,979 B1 | 3/2001 | Hobson et al. |
| 6,218,000 B1 | 4/2001 | Rudolf et al. |
| 6,395,073 B1 | 5/2002 | Dauber |
| 6,613,106 B1 | 9/2003 | Debe et al. |
| 6,645,412 B2 | 11/2003 | Priedeman, Jr. |
| 6,664,362 B2 | 12/2003 | Kobayashi |
| 6,815,471 B2 | 11/2004 | Leidner et al. |
| 6,869,559 B2 | 3/2005 | Hopkins |
| 6,942,120 B2 | 9/2005 | Trent et al. |
| 6,979,805 B2 | 12/2005 | Arthur et al. |
| 7,241,295 B2 | 7/2007 | Maguire |
| 7,253,223 B2 | 8/2007 | Kawato et al. |
| 7,300,975 B2 | 11/2007 | Nodera et al. |
| 7,390,448 B2 | 6/2008 | Flowers et al. |
| 7,534,386 B2 | 5/2009 | Priedeman, Jr. |
| 7,557,154 B2 | 7/2009 | Agarwal et al. |
| 7,682,553 B2 | 3/2010 | Wang et al. |
| 7,754,121 B2 | 7/2010 | Ristic-Lehmann et al. |
| 7,825,176 B2 | 11/2010 | Kim et al. |
| 7,829,617 B2 | 11/2010 | Nodera et al. |
| 7,851,529 B2 | 12/2010 | Mitsuhashi et al. |
| 7,868,090 B2 | 1/2011 | Juikar et al. |
| 7,923,054 B2 | 4/2011 | Dutta et al. |
| 8,067,493 B2 | 11/2011 | Zhu et al. |
| 8,168,707 B2 | 5/2012 | Agarwal et al. |
| 8,349,933 B2 | 1/2013 | Bhandari et al. |
| 8,357,441 B2 | 1/2013 | Van Nuffel et al. |
| 8,439,665 B2 | 5/2013 | Batchelder et al. |
| 8,440,762 B2 | 5/2013 | Van der Mee et al. |
| 8,460,755 B2 | 6/2013 | Rodgers |
| 8,703,856 B2 | 4/2014 | Van De Wetering et al. |
| 8,951,303 B2 | 2/2015 | Dehoff et al. |
| 2001/0016627 A1* | 8/2001 | Koshirai ............ C08L 2666/04 525/192 |
| 2003/0130394 A1* | 7/2003 | Jung ................... C09K 21/04 524/371 |
| 2004/0176511 A1 | 9/2004 | Osamu et al. |
| 2005/0250908 A1 | 11/2005 | Briers et al. |
| 2006/0142455 A1* | 6/2006 | Agarwal ............. B82Y 30/00 524/423 |
| 2007/0123625 A1 | 5/2007 | Dorade et al. |
| 2008/0132632 A1 | 6/2008 | Schiraldi et al. |
| 2008/0161468 A1 | 7/2008 | Juikar et al. |
| 2009/0093576 A1 | 4/2009 | Ballot et al. |
| 2009/0179035 A1 | 7/2009 | Agarwal et al. |
| 2009/0247039 A1 | 10/2009 | Amarasekera et al. |
| 2011/0034098 A1 | 2/2011 | Bouquerel et al. |
| 2011/0054107 A1 | 3/2011 | Hayata et al. |
| 2011/0065845 A1* | 3/2011 | Papazoglou ............ C08L 23/10 524/101 |
| 2011/0183114 A1 | 7/2011 | Kim et al. |
| 2011/0319524 A1 | 12/2011 | Leibler et al. |
| 2013/0158202 A1 | 6/2013 | Bish et al. |
| 2013/0177834 A1 | 7/2013 | Lee et al. |
| 2013/0325109 A1 | 12/2013 | Anneaux et al. |
| 2014/0130470 A1 | 5/2014 | Mori et al. |
| 2015/0183138 A1 | 7/2015 | Duty et al. |
| 2015/0183159 A1 | 7/2015 | Duty et al. |
| 2015/0183164 A1 | 7/2015 | Duty et al. |

FOREIGN PATENT DOCUMENTS

| | | |
|---|---|---|
| CN | 1950443 A | 4/2007 |
| CN | 101316896 A | 12/2008 |
| CN | 101348603 A | 1/2009 |
| CN | 101370868 A | 2/2009 |
| CN | 101952366 A | 1/2011 |
| CN | 102834460 A | 12/2012 |
| CN | 103415562 A | 11/2013 |
| CN | 102382339 B | 1/2014 |
| CN | 103665633 A | 3/2014 |
| CN | 104830040 A | 8/2015 |
| EP | 0335198 A2 | 10/1989 |
| EP | 0598773 A1 | 6/1994 |
| EP | 2428597 A2 | 3/2012 |
| EP | 2542622 A1 | 1/2013 |
| EP | 2545122 A1 | 1/2013 |
| IT | 1098342 B | 9/1985 |
| JP | S62-055533 B2 | 11/1987 |
| JP | H03-091556 A | 4/1991 |
| JP | H07-179742 A | 7/1995 |
| JP | H09-111109 A | 4/1997 |
| JP | H11-199764 A | 7/1999 |
| JP | 2001-031860 A | 2/2001 |
| JP | 2001-164105 A | 6/2001 |
| JP | 3186061 B2 | 7/2001 |
| JP | 3195006 B2 | 8/2001 |
| JP | 2002-371160 A | 12/2002 |
| JP | 2004-149641 A | 5/2004 |
| JP | 2004-315707 A | 11/2004 |
| JP | 2005-002230 A | 1/2005 |
| JP | 2005-327714 A | 11/2005 |
| JP | 3862840 B2 | 12/2006 |
| JP | 4072360 B2 | 4/2008 |
| JP | 4191510 B2 | 12/2008 |
| JP | 4368977 B2 | 11/2009 |
| JP | 2011-033815 A | 2/2011 |
| JP | 4666896 B2 | 4/2011 |
| JP | 2014-047308 A | 3/2014 |
| KR | 1997-0702343 A | 5/1997 |
| KR | 2001-0031025 A | 4/2001 |
| KR | 10-0573200 B1 | 4/2006 |
| KR | 2011-0081657 A | 7/2011 |
| TW | 200403302 A | 3/2004 |
| TW | 200407385 A | 5/2004 |
| TW | 200508299 A | 3/2005 |
| TW | 200938585 A | 9/2009 |
| WO | WO 1993/04129 A1 | 3/1993 |
| WO | WO 1994/011429 A1 | 5/1994 |
| WO | WO 1995/029964 A1 | 11/1995 |
| WO | WO 1998/044876 A1 | 10/1998 |
| WO | WO 2011/107273 A1 | 9/2011 |
| WO | WO 2011/110365 A1 | 9/2011 |
| WO | WO 2012/152859 A1 | 11/2012 |
| WO | WO 2014/034012 A1 | 3/2014 |
| WO | WO 2015/077053 A1 | 5/2015 |

OTHER PUBLICATIONS

Montarnal et al.; "Silica-Like Malleable Materials from Permanent Organic Networks"; Science; vol. 334; Nov. 18, 2011; p. 965-968.

"Transforming the way the world thinks about additive manufacturing"; https://www.e-ci.com/baam/; Cincinnati Incorporated; © 2018; accessed Aug. 22, 2018; 7 pages.

International Patent Application No. PCT/US2017/013172; Int'l Search Report and the Written Opinion; dated Apr. 28, 2017; 10 pages.

International Patent Application No. PCT/US2017/013172; Int'l Preliminary Report on Patentability; dated Jul. 26, 2018; 7 pages.

Alderson et al.; "Microstructural modelling of auxetic microporous polymers"; Journal of Materials Science; vol. 30; Jan. 1995; p. 3319-3332 (abstract only).

Alderson et al.; "Strain-dependent behaviour of microporous polyethylene with a negative Poisson's ratio"; Journal of Materials Science; vol. 28; Jan. 1993; p. 4092-4098 (abstract only).

Samyn et al.; "Tribological properties of PTFE-filled thermoplastic polyimide at high load, velocity, and temperature"; Polymer Composites; vol. 30; Nov. 2009; p. 1631-1646 (abstract only).

Nishihara et al.; "High-order structure and flame retardation effect of poly(tetrafluoroethylene) in thermoplastic resin compositions"; Polymer Journal; vol. 30; 1998; p. 322-326.

(56) References Cited

OTHER PUBLICATIONS

Huang et al.; "Study on the preparation of Polytetrafluoroethylene hollow fiber membranes and the properties"; Advanced Materials Research; vol. 143-144; 2011; p. 106-110.
Huang et al.; "A novel method to prepare hydrophobic poly(tetrafluoroethylene) membrane, and its properties"; Journal of Materials Science; vol. 45; Dec. 2010; p. 6569-6573 (abstract only).
Huang et al.; "Preparation and properties of poly(tetrafluoroethylene) membrane"; Gaofenzi Cailiao Kexue Yu Gongcheng/Polymeric Materials Science and Engineering; vol. 26; May 2010; p. 123-126 (abstract only).
Kurose et al.; "Uniaxial Elongational Viscosity of FEP/ a Small Amount of PTFE Blends"; Journal of the Society of Rheology—Japan; vol. 31; 2003; p. 195-200.
Beekmans et al.; "Nucleation and growth of poly(ε-caprolactone) on poly(tetrafluoroethylene) by in-Situ AFM"; Macromolecules; vol. 35; Dec. 2002; p. 9383-9390 (abstract only).
Rizvi et al.; "Broadening of the foam processing window of polypropylene in extrusion foaming via the incorporation of $CO_2$-philic nanofibers"; Annual Technical Conference—ANTEC; vol. 3; 2013; p. 1840-1846 (abstract only).
Doan et al.; "Localization of nanofibers on polymer surface using interface transfer technique"; Composites Part B: Engineering; vol. 43; Apr. 2012; p. 1218-1223.
Mohd et al.; "Morphology development of polytetrafluoroethylene in a polypropylene melt (IUPAC technical report)"; Pure Applied Chemistry; vol. 83; 2011; p. 1819-1830.
Wang et al.; "Transcrystallization of PTFE fiber/PP composites—III. Effect of fiber pulling on the crystallization kinetics"; Journal of Polymer Science, Part B: Polymer Physics; vol. 36; Jun. 1998; p. 1361-1370 (abstract only).
Fukuhara et al.; "Characterization of fluoropolymer nanofiber sheets fabricated by $CO_2$ laser drawing without solvents"; Industrial and Engineering Chemistry Research; vol. 51; Aug. 2012; p. 10117-10123 (abstract only).
Vail et al.; "Polytetrafluoroethylene (PTFE) fiber reinforced polyetheretherketone (PEEK) composites"; Wear; vol. 270; May 2011; p. 737-741.
Rochman et al.; "An alternative method for processing high viscosity polymers. I. Development and feasibility study"; Polymer Engineering and Science; vol. 52; Oct. 2012; p. 2114-2121.
Schonherr et al.; "The mechanism of PTFE and PE friction deposition: A combined scanning electron and scanning force microscopy study on highly oriented polymeric sliders"; Polymer; vol. 39; Nov. 1998; p. 5705-5709 (abstract only).
Van Der Meer et al.; "Oriented crystallization and mechanical properties of polypropylene nucleated on fibrillated polytetrafluoroethylene scaffolds"; Polymer Engineering and Science; vol. 45; Apr. 2005; p. 458-468 (abstract only).
Jurczuk et al.; "All-polymer nanocomposites with nanofibrillar inclusions generated in situ during compounding"; Polymer; vol. 54; Aug. 2013; p. 4617-4628 (abstract only).
Bernland et al.; "Nucleating polymer crystallization with poly(tetrafluoroethylene) nanofibrils"; Journal of Applied Polymer Science; vol. 114; 2009; p. 281-287 (abstract only).
Jurczuk et al.; "Strain hardening of molten thermoplastic polymers reinforced with poly(tetrafluoroethylene) nanofibers"; Journal of Rheology; vol. 58; May 2014; p. 589-605 (abstract only).
Fan et al.; "Preparation of $ZnIn_2S_4$/fluoropolymer fiber composites and its photocatalytic $H_2$ evolution from splitting of water using Xe lamp irradiation"; Int'l Journal of Hydrogen Energy; vol. 35; Jul. 2010; p. 6525-6530 (abstract only).
Njatawidjaja et al.; "Hydrophilic modification of expanded polytetrafluoroethylene (ePTFE) by atmospheric pressure glow discharge (APG) treatment"; Surface and Coatings Technology; vol. 201; Oct. 2006; p. 699-706 (abstract only).
Zhu; "A fractal model for heat transfer through expanded polytetrafluorethylene membrane"; Int'l Journal of Thermophysics; vol. 34; Jan. 2013; p. 93-100 (abstract only).
Kostromina et al.; "A structural investigation of the sintering of raw polytetrafluoroethylene"; Polymer Science U.S.S.R.; vol. 32; 1990; p. 388-394 (abstract only).
Rasmusson et al. "Adsorption of fibrinogen on thin oriented poly(tetrafluoroethylene) (PTFE) fibres studied by scanning force microscopy"; Scanning Microscopy; vol. 8; 1994; p. 481-490 (abstract only).
Sharma et al.; "Aligned electrospun PVDF-TrFE nanofibers for flexible pressure sensors on catheter"; Transducer and Eurosensors XXVII: the $17^{th}$ Int'l Conf. on Solid-State Sensors, Actuators and Microsystems; Article 6626793; 2013; p. 422-425.
Ainslie et al.; "Cell adhesion on nanofibrous polytetrafluoroethylene (nPTFE)"; Langmuir; vol. 23; Jan. 2007; p. 747-754.
Huczko et al.; "Characterization of 1-D nanoSiC-derived nanoporous carbon"; Physica Status Solidi (B) Basic Research; vol. 244; Nov. 2007; p. 3969-3972 (abstract only).
Muthiah et al.; "Coaxially electrospun PVDF-teflon AF and teflon AF-PVDF core-sheath nanofiber mats with superhydrophobic properties"; Langmuir; vol. 26; Aug. 2010; p. 12483-12487 (abstract only).
Dustoor; "Conforma Clad—A New Process for Customized Coatings"; Int'l Journal of Refractory Metals and Hard Materials; vol. 2; 1983; p. 37-40 (abstract only).
Dustoor; "Conforma Clad—A New Process for Customized Coatings"; The Carbide and Tool Journal; vol. 15; 1983; p. 10-13 (abstract only).
Schwodiauer et al.; "Dielectric and electret properties of novel Teflon PTFE and PTFE-like polymers"; Proceedings Int'l Symposium on Electrets; 1999; p. 313-316 (abstract only).
Teoh et al.; "Dual-layer PVDF/PTFE composite hollow fibers with a thin macrovoid-free selective layer for water production via membrane distillation"; Chemical Engineering Journal; vol. 171; Jul. 2011; p. 684-691.
Takeichi et al.; "Effect of morphology of carbon black fillers on the tribological properties of fibrillated PTFE"; Wear; vol. 264; Feb. 2008; p. 308-315 (abstract only).
Zhang et al.; "Effect of stretching on properties of polytetrafluoroethylene"; Hangkong Cailiao Xuebao/Journal of Aeronautical Materials; vol. 33; Dec. 2013; p. 57-61 (contains English Abstract).
Liu et al.; "Effect of structure on the tribological properties of polytetrafluoroethylene drawn uniaxially at the melting point"; Journal of Applied Polymer Science; vol. 106; Oct. 2007; p. 1332-1336 (abstract only).
Saffarini et al.; "Effect of temperature-dependent microstructure evolution on pore wetting in PTFE membranes under membrane distillation conditions"; Journal of Membrane Science; vol. 429; Feb. 2013; p. 282-294 (abstract only).
Angel et al.; "Electro-Optic and Rheological Behaviour of Aqueous Dispersions of Polytetrafluoroethylene (PTFE) Fibrils"; Berichte der Bunsengesellschaft/Physical Chemistry Chemical Physics; vol. 92; 1988; p. 10-16 (abstract only).
Scheffer et al.; "Electrospun Teflon AF fibers for superhydrophobic membranes"; Journal of Materials Research; vol. 25; Aug. 2010; p. 1595-1600 (abstract only).
Suzuki; "Ethylene tetrafluoroethylene nanofibers prepared by $CO_2$ laser supersonic drawing"; Express Polymer Letters; vol. 7; Jun. 2013; p. 519-527 (abstract only).
Branson et al.; "Expanded PTFE as a Microvascular Graft: A Study of Four Fibril Lengths"; Transactions of the Annual Meeting of the Society for Biomaterials in conjunction with the Int'l Biomaterials Symposium; vol. 7; 1984; p. 95 (abstract only).
Kanazawa et al.; "Fabrication of a porous structure of poly(tetrafluoroethylene) from a mixture with fumaric acid"; Polymer Journal; vol. 42; Jun. 2010; p. 509-513.
Xiong et al.; "Fabrication of ultrafine fibrous polytetrafluoroethylene porous membranes by electrospinning"; Journal of Materials Research; vol. 24; Sep. 2009; p. 2755-2761.
Shi et al.; "Facile fabrication and characterization of poly(tetrafluoroethylene)@polypyrrole/nano-silver composite membranes with conducting and antibacterial property"; Applied Surface Science; vol. 258; Jun. 2012; p. 6359-6365 (abstract only).

(56) References Cited

OTHER PUBLICATIONS

Gan et al.; "Fatigue fracture mechanisms of particle and fiber filled PTFE composites"; Journal of Reinforced Plastics and Composites; vol. 20; 2001; p. 766-785 (abstract only).
Morita et al.; "Features of new PTFE-made microfiltration hollow fiber membrane module and its application for oil and gas wastewater treatment"; AWWA/AMTA Membrane Tech. Conf. and Exposition; 2014; (abstract only).
Bolbasov et al.; "Ferroelectric polymer scaffolds based on a copolymer of tetrafluoroethylene with vinylidene fluoride: Fabrication and properties"; Materials Science and Engineering C; vol. 40; Jul. 2014; 24 pages.
Yamaguchi et al.; "Fine structures in as-polymerized and sintered poly (tetrafluoroethylene)"; Journal of Fiber Science and Technology; vol. 52; Dec. 1996; p. 657-659.
Khalfin et al.; "Fluoropolymer nanofibers by electrospinning"; Technical Proceedings of the NSTI Nanotechnology Conf. and Expo; vol. 2; 2011; p. 129-132 (abstract only).
Zhang et al.; "Formation and structure of polytetrafluoroethylene fibrils"; Journal of Applied Polymer Science; vol. 130; Dec. 2013; p. 3710-3717 (abstract only).
Kitamura et al.; "Formation mechanism of porous structure in polytetrafluoroethylene (PTFE) porous membrane through mechanical operations"; Polymer Engineering and Science; vol. 39; 1999; p. 2256-2263 (abstract only).
Kawamura et al.; "Friction and wear properties of lamella solid lubricant filled fibrillated PTFE composite under the high pressure condition"; Journal of Japanese Society of Tribologists; vol. 48; 2003; p. 230-236 (abstract only).
Kearns et al.; "Friction transfer of polytetrafluoroethylene (PTFE) to produce nanoscale features and influence cellular response in vitro"; Journal of Materials Science: Materials in Medicine; vol. 21; Jul. 2010; p. 2213-2226 (abstract only).
Vasil'kov et al.; "Gold- and silver-containing fibroporous polytetrafluoroethylene obtained under laser irradiation, supercritical carbon dioxide treatment, and metal-vapor synthesis"; Nanotechnologies in Russia; vol. 4; Dec. 2009; p. 834-840.
Meyers et al.; "High strain, high strain rate flow and failure in PTFE/Al/W granular composites"; Proceedings of the SEM Annual Conf. and Exposition on Experimental and Applied Mechanics; 2007; p. 983-984 (abstract only).
Cai et al.; "High strain, high strain rate flow and failure in PTFE/Al/W granular composites"; Materials Science and Engineering A; vol. 472; 2008; p. 308-315.
Burris et al.; "Improved wear resistance in alumina-PTFE nanocomposites with irregular shaped nanoparticles"; Wear; vol. 260; Apr. 2006; p. 915-918 (abstract only).
Rizvi et al.; "In situ fibrillation of CO2-philic polymers: Sustainable route to polymer foams in a continuous process"; Polymer; vol. 54; Aug. 2013; p. 4645-4652 (abstract only).
Luo et al.; "Influence of engineering environment on wetting properties and long-term stability of a superhydrophobic polymer coating"; Journal of Polymer Research; vol. 21; May 2014; (abstract only).
Wang et al.; "Integrated forward osmosis-membrane distillation (FO-MD) hybrid system for the concentration of protein solutions"; Chemical Engineering Science; vol. 66; Jun. 2011; p. 2421-2430 (abstract only).
Cappello et al.; "Mass transport limitations through porous hydrophobic membranes"; American Society of Mechanical Engineers, Fluid Engineering Division; vol. 1C; 2013; (abstract only).
Cai et al.; "Mechanical and microstructural properties of PTFE/Al/W system"; AIP Conference Proceedings; vol. 955; 2007; p. 723-726.
Hagen et al.; "Membrane approach to solid-phase extractions"; Analytica Chimica Acta; vol. 236 Issue C; 1990; p. 157-164 (abstract only).

Fukutake et al.; "Micro- and nano-scale fabrication of fluorinated polymers by direct etching using focused ion beam"; Japanese Journal of Applied Physics; vol. 49 Issue 6; Jun. 2010; p. 0652011-0652015 (abstract only).
Kulcsar et al.; "Microstructure of plastic bonded nickel electrodes"; Journal of Power Sources; vol. 8; 1982; p. 55-59 (abstract only).
Choi et al.; "Microstructure of PTFE and acid absorption behavior in PTFE-bonded carbon electrodes"; Int'l Journal of Hydrogen Energy; vol. 21; Jul. 1996; p. 541-546 (abstract only).
Brown; "Mixed-mode I/II loading of polytetrafluoroethylene"; Proceedings of the SEM Annual Conf. and Exposition on Experimental and Applied Mechanics; 2005; p. 1851-1855 (abstract only).
Mitsoulis et al.; "Modeling of paste extrusion in semi-solid state"; Int'l Journal of Material Forming; vol. 1; Jul. 2008; p. 771-774.
Mitsoulis et al.; "Modelling PTFE paste extrusion: The effect of an objective flow type parameter"; Journal of Non-Newtonian Fluid Mechanics; vol. 159; Jun. 2009; p. 41-49.
Yamaguchi; "Morphological changes of poly(tetrafluoroethylene) by heat treatment on NaCl"; Journal of Materials Research; vol. 8; Nov. 1993; p. 2942-2947 (abstract only).
Kitamura et al.; "Morphology change in polytetrafluoroethylene (PTFE) porous membrane caused by heat treatment"; Polymer Engineering and Science; vol. 40; 2000; p. 809-817 (abstract only).
Geil et al.; "Morphology evolution in PTFE as a function of deformation and melt time and temperature: Nano-fibrils and single- and multi-molecule folded chain single crystals"; Annual Technical Conf.—ANTEC; vol. 2; 2004; p. 2158-2162 (abstract only).
De Souza et al.; "Nanotexturized polytetrafluoroethylene substrates formed by large crystalline nanofibrils in amorphous matrices"; Journal of Nanoscience and Nanotechnology; vol. 8; Apr. 2008; p. 2135-2142 (abstract only).
Lee et al.; "Neurite extension of primary neurons on electrospun piezoelectric scaffolds"; Acta Biomaterialia; vol. 7; Nov. 2011; p. 3877-3886 (abstract only).
Briers; "New development in PTFE-based anti-dripping additives"; Proceedings of the 5th European Conf. on Additives and Colors; 2007; (abstract only).
Anon; "New sealants made of fibrillated PTFE and graphite, (Neue Packung aus fibrilliertem PTFE und Graphit)"; Kunstst-Plast; vol. 17; 1970; (abstract only).
Brinkmann et al.; "Orienting Tetracene and Pentacene Thin Films onto Friction-Transferred Poly(tetrafluoroethylene) Substrate"; Journal of Physical Chemistry B; vol. 107; Sep. 2003; p. 10531-10539 (abstract only).
Ariawan et al.; "Paste extrusion of polytetrafluoroethylene (PTFE) fine powder resins"; Canadian Journal of Chemical Engineering; vol. 80; Dec. 2002; p. 1153-1165 (abstract only).
Ochoa et al.; "Paste extrusion of polytetrafluoroethylene: Temperature, blending and processing aid effects"; Int'l Polymer Processing; vol. 21; Nov. 2006; p. 497-503 (abstract only).
Kalayci et al.; "Polymeric nanofibres in high efficiency filtration applications"; Filtration; vol. 6; Oct. 2006; p. 286-293 (abstract only).
Mori et al.; "Polymerizations of tetrafluoroethylene in homogeneous supercritical fluoroform and in detergent-free heterogeneous emulsion of supercritical fluoroform/water"; Macromolecules; vol. 39; Jan. 2006; p. 604-608 (abstract only).
Iwamor et al.; "Polytetrafluoroethylene (PTFE)-ethylene vinyl alcohol (EVOH) thin films prepared by co-evaporation"; Journal of the Vacuum Society of Japan; vol. 49; 2006; p. 34-39 (abstract only).
O'Leary et al.; "Polytetrafluoroethylene fibril structure"; Journal of Applied Physics; vol. 38; 1967; p. 4169-4181 (abstract only).
Borkar et al.; "Polytetrafluoroethylene nano/microfibers by jet blowing"; Polymer; vol. 47; Nov. 2006; p. 8337-8343 (abstract only).
Ardakani et al.; "Polytetrafluoroethylene paste extrusion: A fibrillation model and its relation to mechanical properties"; Int'l Polymer Processing; vol. 28; 2013; p. 306-313.
Hashida et al.; "Porous structure of biaxially drawn polytetrafluoroethylene film"; Journal of Applied Polymer Science; vol. 32; Nov. 1986; p. 5685-5689 (abstract only).
He et al.; "Preparation and photocatalysis of TiO2-fluoropolymer electrospun fiber nanocomposites"; Polymer; vol. 50; Jun. 2009; p. 3031-3036 (abstract only).

(56) References Cited

OTHER PUBLICATIONS

Huang et al.; "Preparation and properties of polytetrafluoroethylene/CaCO3 hybrid hollow fiber membranes"; Journal of Applied Polymer Science; vol. 123; Jan. 2012; p. 324-330 (abstract only).

Zhu et al.; "Preparation and properties of PTFE hollow fiber membranes for desalination through vacuum membrane distillation"; Journal of Membrane Science; vol. 446; 2013; p. 145-153 (abstract only).

Li et al.; "Preparation and properties of PTFE/PAN blend hollow fiber membrane"; Journal of Materials Engineering; Issue 1; Jan. 2013; p. 12-15 and p. 20 (contains English Abstract).

Rane et al.; "Preparation of superhydrophobic Teflon® AF 1600 sub-micron fibers and yarns using the Forcespinning™ technique"; Journal of Engineered Fibers and Fabrics; vol. 8; 2013; p. 88-95.

Menini et al.; "Production of superhydrophobic polymer fibers with embedded particles using the electrospinning technique"; Polymer Int'l; vol. 57; Jan. 2008; p. 77-84 (abstract only).

Huang et al.; "Sealing and mechanical behaviors of expanded PTFE gasket sheets characterized by PVRC room temperature tightness tests"; Materials Chemistry and Physics; vol. 68; Feb. 2001; p. 180-196 (abstract only).

Chen; "SEM image analysis of pore structure of extending PTFE membrane"; Chinese Journal of Chemical Physics; vol. 18; Apr. 2005; p. 228-232 (abstract only).

Lewis et al.; "Sheets, 3-D strands, trimensional (3-D) shapes, and sutures of either reinforced or nonreinforced expanded polytetrafluoroethylene for facial soft-tissue suspension, augmentation, and reconstruction"; Journal of Long-Term Effects of Medical Implants; vol. 8; 1998; p. 19-42 (abstract only).

Durante et al.; "Short-term patency of 1 mm Ø PTFE prosthesis: An angiographic, doppler-flowmetric and morphological experimental study"; Italian Journal of Anatomy and Embryology; vol. 110 Issue 2; 2005; p. 117-125.

Pierno et al.; "Structural evolution and acoustic phonon behavior in crystalline PTFE latex films"; Materials Research Society Symposium; vol. 779; 2003; p. 275-280 (abstract only).

Liu et al.; "Study on tribological properties of polytetrafluoroethylene drawn uniaxially at different temperature"; Macromolecular Materials and Engineering; vol. 290; p. 172-178 (abstract only).

Dong et al.; "Superhydrophobic PVDF-PTFE electrospun nanofibrous membranes for desalination by vacuum membrane distillation"; Desalination; vol. 347; Aug. 2014; p. 175-183 (abstract only).

Huczko et al.; "Synthesis of novel nanostructures by metal-polytetrafluoroethene thermolysis"; Journal of Physical Chemistry B; vol. 107; Mar. 2003; p. 2519-2524 (abstract only).

Brown et al.; "The effect of crystallinity on the fracture of polytetrafluoroethylene (PTFE)"; Materials Science and Engineering C; vol. 26; Sep. 2006; p. 1338-1343 (abstract only).

Kawamura et al.; "The Effect of Fibrillation on the Tribological Properties of PTFE"; Journal of Japanese Society of Tribologists; vol. 47; 2002; p. 935-941 (abstract only).

Huang et al.; "The formation of structure in PTFE porous membranes induced by the uniaxial stretching operation"; 66th Annual Technical Conf. of the Society of Plastics Engineers; 2008; p. 154-158 (abstract only).

Huang et al.; "The generation of the PTFE porous structure induced by uniaxial stretching process with asymmetric heating operation"; 67th Annual Technical Conf. of the Society of Plastics Engineers; vol. 5; 2009; p. 2858-2862 (abstract only).

Brown et al.; "The role of crystalline phase on fracture and microstructure evolution of polytetrafluoroethylene (PTFE)"; Polymer; vol. 46; Apr. 2005; p. 3056-3068.

Wang et al.; "Transversely stretching behavior of PTFE membrane"; Polymeric Materials Science and Engineering; vol. 24; Dec. 2008; p. 141-144 (abstract only).

Dabrowska et al.; "Ultra-fast efficient synthesis of one-dimensional nanostructures"; Physica Status Solidi (B) Basic Research; vol. 248; Nov. 2011; p. 2704-2707 (abstract only).

Kurose et al.; "Uniaxial elongational viscosity of PC/A small amount of PTFE blend"; Nihon Reoroji Gakkaishi; vol. 33; 2005; p. 173-182.

Reeder; "Unique Alternative to Carbide, Tool Steel and Flame Sprayed Wear Surfaces"; Powder Metallurgy Int'l; vol. 10; 1987; p. 39-40 (abstract only).

Luo et al.; "Various curing conditions for controlling PTFE micro/nano-fiber texture of a bionic superhydrophobic coating surface"; Materials Chemistry and Physics; vol. 119; Jan. 2008; p. 40-47.

Patil et al.; "Viscoelastic flow simulation of polytetrafluoroethylene (PTFE) paste extrusion"; Journal of Non-Newtonian Fluid Mechanics; vol. 153; Jul. 2008; p. 25-33 (abstract only).

He et al.; "Visible-light photocatalytic activity of semiconductor composites supported by electrospun fiber"; Composites Science and Technology; vol. 70; Sep. 2010; p. 1469-1475.

Xu et al.; "Atomic layer deposition of alumina on porous polytetrafluoroethylene membranes for enhanced hydrophilicity and separation performances"; Journal of Membrane Science; vol. 415-416; Oct. 2012; p. 435-443.

Hommura et al.; "Characterization of fibril reinforced membranes for fuel cells"; Journal of Fluorine Chemistry; vol. 120; Apr. 2003; p. 151-155 (abstract only).

Ariawan et al.; "Properties of polytetrafluoroethylene (PTFE) paste extrudates"; Polymer Engineering and Science; vol. 42; Jun. 2002; p. 1247-1259 (abstract only).

Kearns et al.; "Guided gingival fibroblast attachment to titanium surfaces: An in vitro study"; Journal of Clinical Periodontology; vol. 40; Jan. 2013; p. 99-108 (abstract only).

Geil et al.; "Effect of deformation and sintering time and temperature on morphology of PTFE dispersion particles: Nano-fibrils and single- and multi-molecule folded chain single crystals"; Division of Polymeric Materials: Science and Engineering; 2004; (abstract only).

Yang et al.; Morphology evolution in polytetrafluoroethylene as a function of melt time and temperature. Part III. Effect of prior deformation; Polymer; vol. 46; 2005; p. 8723-8733.

* cited by examiner

FIBRILLATED POLYMER COMPOSITIONS AND METHODS OF THEIR MANUFACTURE

CROSS-REFERENCE TO RELATED APPLICATIONS

The present application is a divisional of U.S. application Ser. No. 15/556,690, filed Sep. 8, 2017; which is the National Phase Entry of International Application No. PCT/US2016/022688, filed Mar. 16, 2016; which claims priority to U.S. application 62/133,520, filed Mar. 16, 2015, the entire disclosures of which are incorporated herein by this reference.

BACKGROUND

Many polymer-based articles are manufactured by injection, additive manufacturing, biaxial drawing, pipe extrusion, and other molding processes. In order to obtain good mechanical properties, different approaches have been attempted, such as use of fillers to reinforce the polymers. Despite advances in the art and the success of many filled polymer compositions, there remains a continuing need for improved combinations of properties such as higher modulus, improved ductility, improved impact, and/or improved melt flow characteristics, so that molding operations can be performed more rapidly and with improved economics. Typically, it is difficult to obtain good complex viscosity, extensional viscosity, tensile modulus, and impact strength in a particular polymer composition.

Polytetrafluoroethylene (PTFE) fibers have been used as fillers in polymer compositions, but can aggregate in the matrix resin, making it very difficult to obtain a uniform composition. Polytetrafluoroethylene and other fluoropolymers have also been used as additives in thermoplastic polymers in order to improve certain properties of the polymers. The use of relatively small amounts, for example about 0.1 to about 1 percent by weight, of fluoropolymers as an anti-drip additive in flame retardant grades of thermoplastic resin molding compositions is described, for example, in U.S. Pat. Nos. 4,810,739, 4,579,906, and 4,810,739. The use of sintered PTFE in highly filled thermoplastic compositions as low friction additives is disclosed in U.S. Pat. No. 5,879,791. A drawback to the use of fluoropolymer additives exists, however, in that such additives have poor dispersibility in many polymers.

Therefore, there is a continuing in the art for compositions, methods, and articles that can provide balanced mechanical and rheological property profiles.

SUMMARY

The above-described and other deficiencies of the art are met by polymer compositions comprising a matrix polymer component comprising a crystalline or semi-crystalline polymer; and 0.1 weight percent (wt. %) to 15 wt. %, or about 0.1 wt. % to about 15 wt. %, based on the weight of the polymer composition, of a fibrillated fluoropolymer, a fibrillated fluoropolymer encapsulated by an encapsulating polymer, or a combination thereof.

In another embodiment are articles of manufacture comprising these polymer compositions. In still another embodiment of methods of processing these polymer compositions.

The above described and other features are exemplified by the following drawings, detailed description, examples, and claims.

BRIEF DESCRIPTION OF THE DRAWINGS

The following is a brief description of the drawings wherein like elements are numbered alike and which are exemplary of the various embodiments described herein.

DETAILED DESCRIPTION OF ILLUSTRATIVE EMBODIMENTS

Figure 1:
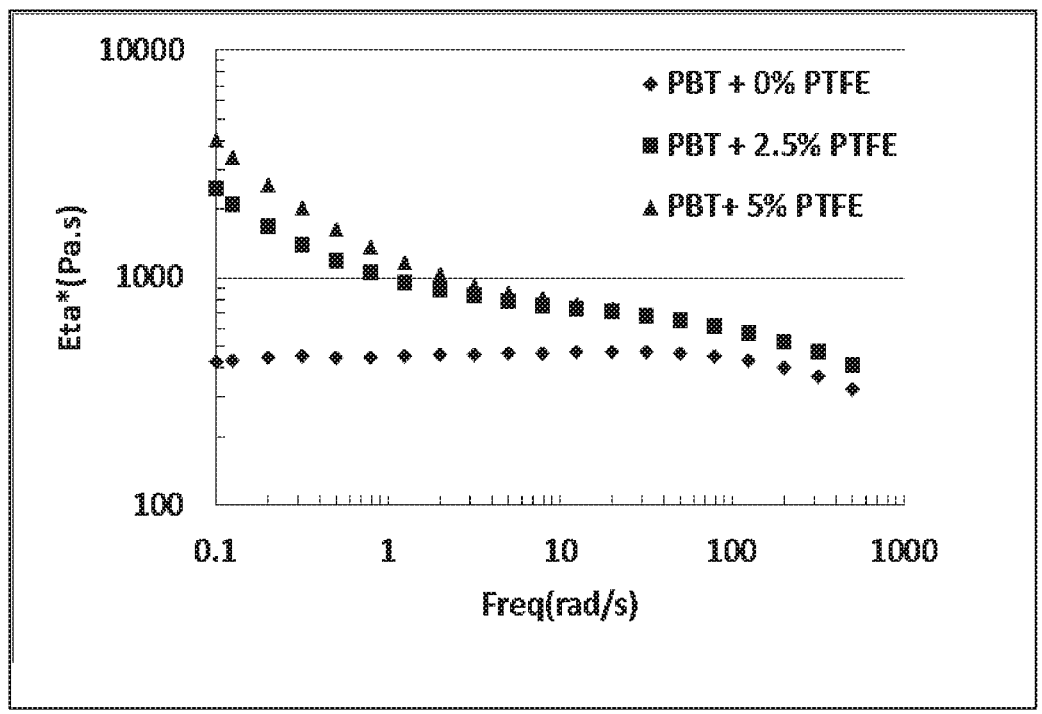
FIG. 1 depicts complex viscosity for embodiments of the disclosure incorporating PBT.

The present disclosure may be understood more readily by reference to the following detailed description of desired embodiments and the examples included therein. In the following specification and the claims that follow, reference will be made to a number of terms which have the following meanings.

The present disclosure is directed to polymer compositions comprising a matrix polymer component comprising a crystalline or semi-crystalline polymer; and a fibrillated fluoropolymer, a fibrillated fluoropolymer encapsulated by an encapsulating polymer, or a combination thereof. Methods of using these polymer compositions, as well as articles formed from these compositions, are also described. The described polymer compositions exhibit surprising melt strengths, making them suitable for use in foaming, sheet, and pipe extrusion processes.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of". The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

The present disclosure is directed to polymer compositions comprising a matrix polymer component comprising a crystalline or semi-crystalline polymer; and a fibrillated fluoropolymer, a fibrillated fluoropolymer encapsulated by an encapsulating polymer, or a combination thereof. In preferred embodiments, the polymer compositions comprise 0.1 wt. % to 15 wt. %, or from about 0.1 wt. % to about 15 wt. %, based on the weight of the polymer composition, of a fibrillated fluoropolymer, a fibrillated fluoropolymer encapsulated by an encapsulating polymer, or a combination thereof. Methods of using these polymer compositions, as well as articles formed from these compositions, are also described.

The polymer compositions of the description have mechanical and rheological properties that are surprising and unexpected. For example, the described polymer compositions have a complex viscosity, measured at a 0.1 rad/sec, of greater than 4500 Pa·s (Pascal-second), or greater than about 4500 Pa·s, preferably between about 4500 Pa·s and about 70,000 Pa·s, for example, between 4500 Pa·s and 70,000 Pa·s. For example, the described polymer compositions have a complex viscosity of about 4500, 5000, 5500, 6000, 6500, 7000, 7500, 8000, 8500, 9000, 9500, 10,000, 11,000, 12,000, 13,000, 14,000, 15,000, 16,000, 17,000, 18,000, 19,000, 20,000, 25,000, 30,000, 35,000, 40,000, 45,000, 50,000, 55,000, 60,000, 65,000, or about 70,000 Pa·s.

In other embodiments, the described polymer compositions have an extensional viscosity of greater than 11,000, preferably between about 11,000 and about 90,000 Pa·s at a maximum henky strain of 2.0 at a strain rate of 1 s$^{-1}$. For example, the described polymer compositions have an extensional viscosity of about 11,000, 12,000, 13,000, 14,000, 15,000, 16,000, 17,000, 18,000, 19,000, 20,000, 25,000, 30,000, 35,000, 40,000, 45,000, 50,000, 55,000, 60,000, 65,000, 70,000, 75,000, 80,000, 85,000, or about 90,000 Pa·s at a maximum henky strain of 2.0 at a strain rate of 1 s$^{-1}$. In still other embodiments, the described polymer compositions have a tensile modulus of greater than 2450 megapascals (MPa), preferably greater than 2450 to about 3000 MPa. For example, the described polymer compositions have a tensile modulus of 2455, 2460, 2465, 2470, 2475, 2480, 2485, 2490, 2495, 2500, 2510, 2520, 2530, 2540, 2550, 2560, 2570, 2580, 2590, 2600, 2610, 2620, 2630, 2640, 2650, 2660, 2670, 2680, 2690, 2700, 2710, 2720, 2730, 2740, 2750, 2760, 2770, 2780, 2790, 2800, 2810, 2820, 2830, 2840, 2850, 2860, 2870, 2880, 2890, 2900, 2510, 2920, 2930, 2940, 2950, 2960, 2970, 2980, 2990, or about 3000 MPa. In yet other embodiments, the described polymer compositions have a notched impact strength (ISO 180 at 23° C.) of greater than 3.5 kilojoule per square meter (KJ/m$^2$), or greater than about 3.5 KJ/m$^2$, preferably 3.5 KJ/m$^2$ to about 10 KJ/m$^2$. For example, the described polymer compositions have a notched impact strength of 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, or about 10 KJ/m$^2$.

The matrix polymer component comprises one or more polymers that are not fibrillated during the mixing process described herein. Examples of suitable matrix polymers of the disclosure exclude polycarbonate polymers. Suitable polymers are crystalline and semi-crystalline thermoplastic materials. Examples of suitable polymers are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), polypropylene (PP) (including random, co-polymer, and homopolymer polypropylene), and combinations comprising at least one of the foregoing polyesters. Also contemplated are the above polyesters with a minor amount, e.g., from 0.5 to 10 percent by weight, or from about 0.5 to about 10 percent by weight, of units derived from an aliphatic diacid and/or an aliphatic polyol to make copolyesters. Other useful polymers include nylon, linear low-density polyethylene (LLDPE), low-density polyethylene (LDPE), high density polyethylene (HDPE), and combinations thereof. Particularly preferred polymers for use in the matrix polymer are PBT, PET, and PP. The matrix polymer may generally be provided in any form, including but not limited to powders, plates, pellets, flakes, chips, whiskers, and the like.

The polymer compositions described herein comprise 0.1 wt. % to 15 wt. %, or from about 0.1 wt. % to about 15 wt. %, based on the weight of the polymer composition, of a fibrillated fluoropolymer, a fibrillated fluoropolymer encapsulated by an encapsulating polymer, or a combination thereof. According to the disclosure, the polymer compositions comprise 0.1 wt. % to 15 wt. %, or from about 0.1 wt. % to about 15 wt. %, for example, 1 wt. % to 10 wt. %, or from about 1 wt. % to about 10 wt. %, based on the weight of the polymer composition, of the fibrillated fluoropolymer, the fibrillated fluoropolymer encapsulated by an encapsulating polymer, or the combination thereof. In some embodiments, the polymer compositions comprise about 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, or about 15 wt. %, based on the weight of the polymer composition, of the fibrillated fluoropolymer, the fibrillated fluoropolymer encapsulated by an encapsulating polymer, or the combination thereof.

Fluoropolymers suitable for use as the fluoropolymer component described in U.S. Pat. No. 7,557,154 and are capable of being fibrillated ("fibrillatable") during mixing with the matrix polymer, the filler, or both simultaneously. "Fibrillation" is a term of art that refers to the treatment of fluoropolymers so as to produce, for example, a "node and fibril," network, or cage-like structure. Suitable fluoropolymers include but are not limited to homopolymers and copolymers that comprise structural units derived from one or more fluorinated alpha-olefin monomers, that is, an alpha-olefin monomer that includes at least one fluorine atom in place of a hydrogen atom. In one embodiment the fluoropolymer comprises structural units derived from two or more fluorinated alpha-olefin, for example tetrafluoroethylene, hexafluoroethylene, and the like. In another embodiment, the fluoropolymer comprises structural units derived from one or more fluorinated alpha-olefin monomers and one or more non-fluorinated monoethylenically unsaturated monomers that are copolymerizable with the fluorinated monomers, for example alpha-monoethylenically unsaturated copolymerizable monomers such as ethylene, propylene, butene, acrylate monomers (e.g., methyl methacrylate and butyl acrylate), vinyl ethers, (e.g., cyclohexyl vinyl ether, ethyl vinyl ether, n-butyl vinyl ether, vinyl esters) and the like. Specific examples of fluoropolymers include polytetrafluoroethylene, polyhexafluoropropylene, polyvinylidene fluoride, polychlorotrifluoroethylene, ethylene tetrafluoroethylene, fluorinated ethylene-propylene, polyvinyl fluoride, and ethylene chlorotrifluoroethylene. Combinations comprising at least one of the foregoing fluoropolymers may also be used. Polytetrafluoroethylene is particularly preferred.

As is known, fluoropolymers are available in a variety of forms, including powders, emulsions, dispersions, agglomerations, and the like. "Dispersion" (also called "emulsion") fluoropolymers are generally manufactured by dispersion or emulsion, and generally comprise about 25 to 60 weight % fluoropolymer in water, stabilized with a surfactant, wherein the fluoropolymer particles are approximately 0.1 to 0.3 micrometers in diameter. "Fine powder" (or "coagulated dispersion") fluoropolymers may be made by coagulation and drying of dispersion-manufactured fluoropolymers. Fine powder fluoropolymers are generally manufactured to have a particle size of approximately 400 to 500 microns. "Granular" fluoropolymers may be made by a suspension method, and are generally manufactured in two different particle size ranges, including a median particle size of approximately 30 to 40 micrometers, and a high bulk density product exhibiting a median particle size of about 400 to 500 micrometers. Pellets of fluoropolymer may also be obtained and cryogenically ground to exhibit the desired particle size.

In one embodiment the fluoropolymer is at least partially encapsulated by an encapsulating polymer that may be the same or different as the matrix polymer (hereinafter referred to as an "encapsulated polymer"). Without being bound by theory, it is believed that encapsulation may aid in the distribution of the fluoropolymer within the matrix, and/or compatibilize the fluoropolymer with the matrix.

Suitable encapsulating polymers accordingly include, but are not limited to, vinyl polymers, acrylic polymers, polyacrylonitrile, polystyrenes, polyolefins, polyesters, polyurethanes, polyamides, polysulfones, polyimides, polyetherimides, polyphenylene ethers, polyphenylene sulfides, polyether ketones, polyether ether ketones, ABS resins, polyethersulfones, poly(alkenylaromatic) polymers, polybutadiene, liquid crystalline polymers, polyacetals, polycarbonates, polyphenylene ethers, ethylene-vinyl acetate copolymers, polyvinyl acetate, liquid crystal polymers, ethylenetetrafluoroethylene copolymer, aromatic polyesters, polyvinyl fluoride, polyvinylidene fluoride, polyvinylidene chloride, and combinations comprising at least one of the foregoing polymers.

Particularly preferred encapsulating polymers comprise a styrene-acrylonitrile copolymer, an acrylonitrile-butadiene-styrene copolymer, alpha-alkyl-styrene-acrylonitrile copolymer, an alpha-methylstyrene-acrylonitrile copolymer, a styrene-butadiene rubber, or a combination thereof. Styrene-acrylonitrile copolymer encapsulated polytetrafluoroethylene is one preferred embodiment.

The encapsulating polymers may be obtained by polymerization of monomers or mixtures of monomers by methods known in the art, for example, condensation, addition polymerization, and the like. Emulsion polymerization, particularly radical polymerization may be used effectively. In one embodiment, the encapsulating polymer is formed from monovinylaromatic monomers containing condensed aromatic ring structures, such as vinyl naphthalene, vinyl anthracene and the like. Examples of suitable monovinylaromatic monomers include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing compounds. Styrene and/or alpha-methylstyrene may be specifically mentioned.

Other useful monomers for the formation of the encapsulating polymer include monovinylic monomers such as itaconic acid, acrylamide, N-substituted acrylamide or methacrylamide, maleic anhydride, maleimide, N-alkyl-, aryl-, or haloaryl-substituted maleimide, and glycidyl (meth)acrylates. Other examples include acrylonitrile, ethacrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers.

Mixtures of the foregoing monovinylaromatic monomers and monovinylic monomers may also be used, for example mixtures of styrene and acrylonitrile (SAN). The relative ratio of monovinylaromatic and monovinylic monomers in the rigid graft phase may vary widely depending on the type of fluoropolymer, type of monovinylaromatic and monovinylic monomer(s), and the desired properties of the encapsulant. The encapsulant may generally be formed from up to 100 wt. %, or up to about 100 wt. %, of monovinyl aromatic monomer, specifically 30 to 100 wt. %, or about 30 to about 100 wt. %, more specifically, 50 to 90 wt. %, or about 50 to about 90 wt. % monovinylaromatic monomer, with the balance being comonomer(s). A preferred fluoropolymer is TSAN, which comprises SAN and PTFE. See, U.S. Pat. Nos. 5,804,654 and 6,040,370.

Elastomers may also be used as the encapsulating polymer, as well as elastomer-modified graft copolymers. Suitable elastomers include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric C1-8 alkyl (meth)acrylates; elastomeric copolymers of C1-8 alkyl (meth)acrylates with butadiene and/or styrene; or combinations comprising at least one of the foregoing elastomers.

Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubbers may also be used, for example those produced by aqueous radical emulsion polymerization of a conjugated diene and up to 10 wt. %, or up to about 10 wt. %, of one or more monomers copolymerizable therewith. Specific copolymers include styrene and acrylonitrile.

(Meth)acrylate monomers suitable for use as an elastomeric encapsulating monomer include the cross-linked, particulate emulsion homopolymers or copolymers of C4-8 alkyl (meth)acrylates, in particular C4-6 alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. Exemplary comonomers include but are not limited to butadiene, isoprene, styrene, methyl methacrylate, phenyl methacrylate, phenethylmethacrylate, N-cyclohexylacrylamide, vinyl methyl ether or acrylonitrile, and mixtures comprising at least one of the foregoing comonomomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

Suitable elastomer-modified graft copolymers may be prepared by first providing an elastomeric polymer (for example, as described above), then polymerizing the constituent monomer(s) of the rigid phase in the presence of the fluoropolymer and the elastomer to obtain the graft copolymer. The elastomeric phase may provide 5 to 95 wt. %, or about 5 to about 95 wt. %, of the total graft copolymer, more specifically, 20 to 90 wt. %, about 20 to about 90 wt. %, and even more specifically, 40 to 85 wt. %, or about 40 to about 85 wt. % of the elastomer-modified graft copolymer, the remainder being the rigid graft phase. Depending on the amount of elastomer-modified polymer present, a separate matrix or continuous phase of ungrafted rigid polymer or copolymer may be simultaneously obtained along with the elastomer-modified graft copolymer.

Specific encapsulating polymers include polystyrene, copolymers of polystyrene, poly(alpha-methylstyrene), poly(alpha-ethylstyrene), poly(alpha-propylstyrene), poly(alpha-butylstyrene), poly(p-methylstyrene), polyacrylonitrile, polymethacrylonitrile, poly(methyl acrylate), poly(ethyl acrylate), poly(propyl acrylate), and poly(butyl acrylate), poly(methyl methacrylate), poly(ethyl methacrylate), poly(propyl methacrylate), poly(butyl methacrylate); polybutadiene, copolymers of polybutadiene with propylene, poly(vinyl acetate), poly(vinyl chloride), poly(vinylidene chloride), poly(vinylidene fluoride), poly(vinyl alcohols), acrylonitrile-butadiene copolymer rubber, acrylonitrile-butadiene-styrene (ABS), poly(C4-8 alkyl acrylate) rubbers, styrene-butadiene rubbers (SBR), EPDM rubbers, silicon rubber and combinations comprising at least one of the foregoing encapsulating polymers.

In another embodiment, the encapsulating polymer comprises SAN, ABS copolymers, alpha-(C1-3)alkyl-styrene-acrylonitrile copolymers, alpha-methylstyrene-acrylonitrile (AMSAN) copolymers, SBR, and combinations comprising at least one of the foregoing. In yet another embodiment the encapsulating polymer is SAN or AMSAN.

Suitable amounts amount of encapsulating polymer may be determined by one of ordinary skill in the art without undue experimentation, using the guidance provided below. In one embodiment, the encapsulated fluoropolymer comprises 10 to 90 weight percent (wt. %), or about 10 to about 90 wt. % fluoropolymer and 90 to 10 wt. %, or about 90 to about 10 wt. %, of the encapsulating polymer, based on the total weight of the encapsulated fluoropolymer. Alternatively, the encapsulated fluoropolymer comprises 20 to 80 wt. %, or about 20 to about 80 wt. %, more specifically, 40 to 60 wt. %, or about 40 to about 60 wt. % fluoropolymer, and 80 to 20 wt. %, or about 80 to about 20 wt. %, specifically, 60 to 40 wt. %, or about 60 to about 40 wt. % encapsulating polymer, based on the total weight of the encapsulated polymer.

Some embodiments of the disclosure are polymer compositions that exclude filler.

In other embodiments, the polymer compositions comprise a filler, including the fillers and solid compounding ingredients or agents commonly used in polymeric compositions. Without being bound by theory, it is believed that the advantageous results obtained herein are due to a synergistic interaction between the filler and fluoropolymer, which interaction arises during the mixing process described below.

One useful class of fillers is the particulate fillers, which may be of any configuration, for example spheres, plates, fibers, acicular, flakes, whiskers, or irregular shapes. Suitable fillers typically have an average longest dimension of 1 nanometer (nm) to 500 micrometers (μm), or 1 nanometer to 500 micrometers, specifically 10 nanometer to 100 micrometers, or about 10 nanometers to about 100 micrometers. The average aspect ratio (length:diameter) of some fibrous, acicular, or whisker-shaped fillers (e.g., glass or wollastonite) may be 1.5 to 1000, or about 1.5 to about 1000, although longer fibers are also within the scope of the disclosure. The mean aspect ratio (mean diameter of a circle of the same area: mean thickness) of plate-like fillers (e.g., mica, talc, or kaolin) may be greater than 5, or greater than about 5, specifically 10 to 100, or about 10 to about 1000, more specifically 10 to 200, or about 10 to about 200. Bimodal, trimodal, or higher mixtures of aspect ratios may also be used.

The fillers may be of natural or synthetic, mineral or non-mineral origin, provided that the fillers have sufficient thermal resistance to maintain their solid physical structure at least at the processing temperature of the composition with which it is combined. Suitable fillers include clays, nanoclays, carbon black, wood flour either with or without oil, various forms of silica (precipitated or hydrated, fumed or pyrogenic, vitreous, fused or colloidal, including common sand), glass, metals, inorganic oxides (such as oxides of the metals in Periods 2, 3, 4, 5 and 6 of Groups Ib, IIb, IIIa, IIIb, IVa, IVb (except carbon), Va, VIIa, VIIa and VIII of the Periodic Table), oxides of metals (such as aluminum oxide, titanium oxide, zirconium oxide, titanium dioxide, nanoscale titanium oxide, aluminum trihydrate, vanadium oxide, and magnesium oxide), hydroxides of aluminum or ammonium or magnesium, carbonates of alkali and alkaline earth metals (such as calcium carbonate, barium carbonate, and magnesium carbonate), antimony trioxide, calcium silicate, diatomaceous earth, fuller earth, kieselguhr, mica, talc, slate flour, volcanic ash, cotton flock, asbestos, kaolin, alkali and alkaline earth metal sulfates (such as sulfates of barium and calcium sulfate), titanium, zeolites, wollastonite, titanium boride, zinc borate, tungsten carbide, ferrites, molybdenum disulfide, asbestos, cristobalite, aluminosilicates including Vermiculite, Bentonite, montmorillonite, Na-montmorillonite, Ca-montmorillonite, hydrated sodium calcium aluminum magnesium silicate hydroxide, pyrophyllite, magnesium aluminum silicates, lithium aluminum silicates, zirconium silicates, and combinations comprising at least one of the foregoing fillers. Suitable fibrous fillers include glass fibers, basalt fibers, aramid fibers, carbon fibers, carbon nanofibers, carbon nanotubes, carbon buckyballs, ultra-high molecular weight polyethylene fibers, melamine fibers, polyamide fibers, cellulose fiber, metal fibers, potassium titanate whiskers, and aluminum borate whiskers.

Of these, calcium carbonate, talc, glass fibers, carbon fibers, magnesium carbonate, mica, silicon carbide, kaolin, wollastonite, calcium sulfate, barium sulfate, titanium, silica, carbon black, ammonium hydroxide, magnesium hydroxide, aluminum hydroxide, and combinations comprising at least one of the foregoing are useful. It has been found that mica, talc, silicon carbide, and combinations comprising at least one of the foregoing fillers are of specific utility.

Alternatively, or in addition to a particulate filler, the filler may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable co-woven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

Optionally, the fillers may be surface modified, for example treated so as to improve the compatibility of the filler and the polymeric portions of the compositions, which facilitates de-agglomeration and the uniform distribution of fillers into the polymers. One suitable surface modification is the durable attachment of a coupling agent that subsequently bonds to the polymers. Use of suitable coupling agents may also improve impact, tensile, flexural, and/or dielectric properties in plastics and elastomers; film integrity, substrate adhesion, weathering and service life in coatings; and application and tooling properties, substrate adhesion, cohesive strength, and service life in adhesives and sealants. Suitable coupling agents include silanes, titanates, zirconates, zircoaluminates, carboxylated polyolefins, chromates, chlorinated paraffins, organosilicon compounds, and reactive cellulosics. The fillers may also be partially or entirely coated with a layer of metallic material to facilitate conductivity, e.g., gold, copper, silver, and the like.

Optionally the polymer composition may further contain one or more additives ordinarily incorporated in resin compositions of this type, preferably with the proviso that the additive(s)s are selected so as to not significantly adversely affect the desired properties of the thermoplastic composition. Mixtures of additives may be used. Such additives may be mixed at a suitable time during the mixing of the components for forming the composition. Exemplary additives include extenders, lubricants, flow modifiers, fire retardants, pigments, dyes, colorants, UV stabilizers, antioxidants, impact modifiers, plasticizers, optical brighteners, flame proofing agents, anti-static agents, blowing agents, and the like.

Suitable antioxidant additives include, for example, organophosphites such as tris(nonyl phenyl)phosphite, tris (2,4-di-t-butylphenyl)phosphite, (2,4,6-tri-tert-butylphenyl) (2-butyl-2-ethyl-1,3-propanediol)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; acylaminophenols; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis [3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.1 to about 5 parts by weight, based on 100 parts by weight of the polymeric portion of the composition (matrix polymer, fluoropolymer, and any impact modifier).

Suitable heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, and combinations comprising at least one of the foregoing heat stabilizers. Heat stabilizers are generally used in amounts of 0.1 to 5 parts by weight, or about 0.1 to about 5 parts by weight, based on 100 parts by weight of the polymeric part of the composition.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of 0.5 to 20 parts by weight, or about 0.5 to about 20 parts by weight, based on 100 parts by weight of the polymer portion of the composition.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB 5411); 2-hydroxy-4-n-octyloxybenzophenone (CYASORB 531); 2-[4,6-bis(2,4-dimethylphenyl)-1,3, 5-triazin-2-yl]-5-(octyloxy)-phenol (CYASORB1164); 2,2'-(1,4-phenylene)bis(4H-3,1-benzoxazin-4-one) (CYASORB UV-3638); 1,3-bis[(2-cyano-3,3-diphenylacryloyl)oxy]-2,2-bis[[(2-cyano-3,3-diphenylacryloyl)oxy]methyl]propane (UVINUL 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of 0.5 to 20 parts by weight, or about 0.5 to about 20 parts by weight, based on 100 parts by weight of the polymer portion of the composition.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; sodium, calcium or magnesium salts of fatty acids such as lauric acid, palmitic acid, oleic acid or stearic acid; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax, EBS wax, or the like. Such materials are generally used in amounts of 0.1 to 20 parts by weight, or about 0.1 to about 20 parts by weight, based on 100 parts by weight of the polymer portion of the composition.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat 6321 (Sanyo) or Pebax MH1657 (Atofina), Irgastat P18 and P22 (Ciba-Geigy). Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of 0.05 to 20 parts by weight, or about 0.05 to about 20 parts by weight, based on 100 parts by weight of the polymer portion of the composition.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of 0.1 to 20 parts by weight, or about 0.1 to about 20 parts by weight, based on 100 parts by weight of the polymer portion of the composition.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly (C2-8) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes are generally used in amounts of 0.01 to 20 parts by weight, or about 0.01 to about 20 parts by weight, based on 100 parts by weight of the polymer portion of the composition.

Where a foam is desired, suitable blowing agents include for example, low boiling halohydrocarbons and those that generate carbon dioxide; blowing agents that are solid at room temperature and when heated to temperatures higher than their decomposition temperature, generate gases such as nitrogen, carbon 25 dioxide ammonia gas, such as azodicarbonamide, metal salts of azodicarbonamide, 4,4' oxybis (benzenesulfonylhydrazide), sodium bicarbonate, ammonium carbonate, or the like, or combinations comprising at least one of the foregoing blowing agents. Blowing agents are generally used in amounts of 0.01 to 15 parts by weight, or about 0.01 to about 15 parts by weight, based on 100 parts by weight of the polymer portion of the composition.

Suitable flame retardant that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Neutralizing additives may be for example, melamine, polyvinylpyrrolidone, dicyandiamide, triallyl cyanurate, urea derivatives, hydrazine derivatives, amines, polyamides, and polyurethanes; alkali metal salts and alkaline earth metal salts of higher fatty acids, such as for example, calcium stearate, calcium stearoyl lactate, calcium lactate, zinc stearate, magnesium stearate, sodium ricinoleate, and potassium palmitate; antimony pyrocatecholate, zinc pyrocatecholate, and hydrotalcites and synthetic hydrotalcites. Hydroxy carbonates, magnesium zinc hydroxycarbonates, magnesium aluminum hydroxycarbonates, and aluminum zinc hydroxycarbonates; as well as metal oxides, such as zinc oxide, magnesium oxide and calcium oxide; peroxide scavengers, such as, e.g., (C10-C20) alkyl esters of beta-thiodipropionic acid, such as for example the lauryl, stearyl, myristyl or tridecyl esters; mercapto benzimidazole or the zinc salt of 2-mercaptobenzimidazole, zinc-dibutyldithiocarbamate, dioctadecyldisulfide, and pentaerythritol tetrakis(.beta.-dodecylmercapto)propionate may also be used. When present, the neutralizers may be used in amounts of 5 to 50 parts by weight, or about 5 to about 50 parts by weight, more specifically 10 to 40 parts by weight, or about 10 to about 40 parts by weight, based on 100 parts by weight of the polymer portion of the composition.

In yet another embodiment, the optional additive is a polyamide stabilizer, such as, copper salts in combination with iodides and/or phosphorus compounds and salts of divalent manganese. Examples of sterically hindered amines include but are not restricted to triisopropanol amine or the reaction product of 2,4-dichloro-6-(4-morpholinyl)-1,3,5-triazine with a polymer of 1,6-diamine, N,N'-Bis(-2,2,4,6-tetramethyl-4-piperidinyl) hexane.

The components of the composition are mixed under conditions of shear and temperature effective to produce the desired characteristics in the mixed composition. Suitable mixing methods for achieving the desired shear and temperature conditions may be, for example, extrusion kneading, roll kneading, or mixing in a two-roll mill, a Banbury mixer, a single screw or twin-screw extruder, a double blade batch mixer, a vertical shaft mixer, a planetary mixer, a Becken blade mixer, a dispersion blade mixer, a sigma mixer, in continuous batch mixers of the hydrofoil, turbine blade, or CF impeller blade type, static mixers and the like devices, which are capable of imparting a controlled degree of shear. In one embodiment a single screw or a twin-screw extruder is used. The twin-screw extruder may be co-rotating, counter rotating, intermeshing, non-intermeshing, or the like, for example a, planetary gear extruder Readco (York, Pa.) continuous mixer. The mixing may be conducted in a continuous or a batch process. When melt blending or reactive melt blending is used, the mixing is generally conducted at a temperature and for a time effective to produce a molten mixture of a substantially homogenous composition.

The time, temperature, apparatus, component addition sequence and location (along an extruder, e.g.), and other conditions of mixing are accordingly selected so as to produce a composition having an improved modulus compared to compositions not containing both filler and fluoropolymer. Those of ordinary skill in the art will be able to adjust the degree of shear and temperature, as well as other parameters, without undue additional experimentation using the guidance provided herein.

In one embodiment, the polymer compositions may be prepared by pre-combining the matrix polymer, fluoropolymer, and optional filler prior to mixing under suitable conditions of temperature and shear, although such pre-combining is not necessary. The pre-combining may be carried out in any conventional mixer (e.g., drum mixer, ribbon mixer, vertical spiral mixer, Muller mixer, sigma mixer, chaotic mixer, static mixer, and the like). Pre-combining is typically carried out at a temperature below the degradation temperature of the matrix polymer, fluoropolymer, and any encapsulating polymer. Alternatively, a portion of the matrix polymer may be pre-combined with the fluoropolymer (with or without one or more additives) to prepare a masterbatch, and then the remaining matrix polymer may be added and mixed therewith later.

In general, suitable mixing (fibrillation) conditions include temperatures at or above the glass transition temperature of the matrix polymer and below the softening temperature of the fluoropolymer. The mixing temperature is also preferably below the degradation temperature of the matrix polymer. Suitable temperatures may be from 20° C. to 450° C., or from about 20° C. to about 450° C., more specifically, 50° C. to 400° C., or from about 50° C. to about 400° C., even more specifically, from 100° C. to 300° C., or from about 100° C. to about 300° C. At these temperatures, processing may be conducted for about 2 seconds to about 10 hours, specifically about 3 seconds to about six hours.

A modulated differential scanning calorimetry (DSC) method for determining extent of fibrillation of the fluoropolymer in the various compositions was may be used to monitor the course and degree of fibrillation. For example a Q1000 differential scanning calorimeter from TA Instruments may be used to conduct DSC is conduct on approximately 1 to 5 mg of sample, and observations recorded around 320 to 360° C. (modulation range). A peak around 330° C. is observed, and may be deconvoluted into three different peaks, wherein the different peak temperatures correspond to different forms of fluoropolymer. A plot was constructed using the raw data points from MDSC, and through baseline adjustment a clear magnified peak was observed (after subtraction). Deconvolution was made to fit gauss Ian curves around 326° C. for melt crystallized PTFE, 330° C. for fibrillated PTFE, and 338° C. for native PTFE (nodal PTFE). The area under each curve was found to have a strong correlation with optimization of properties such as tensile modulus. In particular, a Node: Fibril ratio may be calculated based on the area under 338° C. peak (node) and 330° peak (fibril).

In one embodiment, the mixed fluoropolymer comprises fibrils having an average diameter of 5 nanometers to 2 micrometers, or about 5 nanometers to about 2 micrometers. The fluoropolymer may also have an average fibril diameter of 30 to 750 nanometers, or from about 30 to about 750 nanometers, more specifically, 5 to 500 nanometers, or from about 5 to about 500 nanometers. (Average diameters may be measured by scanning electron microscopy (SEM)). The ratio of the node fraction to fibril fraction (as reflected in the area under the curve in the DSC determinations) of the mixed fluoropolymers may be less than 2.5, or less than about 2.5, specifically less than 2, or about 2, and even more specifically less than 1, or less than about 1.

After mixing, the composition so formed may be made into a particulate form, for example by pelletizing or grinding. For example, the molten mixture from an extruder may be fed into a die. Some non-limiting examples of suitable dies include an annular die, coat hanger die, spiral mandrel die, crosshead die, T-die, fishtail die, spider die, single, or double roller die, or profile extrusion die.

The described polymer compositions can be molded into useful articles by a variety of means. For example, the polymer compositions can be subjected to injection molding, extrusion molding, rotation molding, foam molding, calendar molding, blow molding, thermoforming, compaction, melt spinning, pipe extrusion and the like, to form articles. Particularly preferred methods include subjecting the polymer compositions of the description to processes comprising foaming, sheet forming, and pipe extrusion.

Because of their advantageous mechanical characteristics, especially preferred are articles that will be exposed to ultraviolet (UV) light, whether natural or artificial, during their lifetimes, and most particularly outdoor and indoor articles. Suitable articles are exemplified by but are not limited to aircraft, automotive, truck, military vehicle (including automotive, aircraft, and water-borne vehicles), scooter, and motorcycle exterior and interior components, including panels, quarter panels, rocker panels, trim, fenders, doors, decklids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; counter tops; protected graphics; outdoor and indoor signs; enclosures, housings, panels, and parts for automatic teller machines (ATM); computer; desk-top computer; portable computer; lap-top computer; palm-held computer housings; monitor; printer; keyboards; FAX machine; copier; telephone; phone bezels; mobile phone; radio sender; radio receiver; enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated painted articles; coated dyed articles; coated fluorescent articles; coated foam articles; and like applications. The disclosure further contemplates additional fabrication operations on said articles, such as, but not limited to, molding, in-mold decoration, baking in a paint oven, lamination, and/or thermoforming. The articles made from the composition of the present disclosure may be used widely in automotive industry, home appliances, electrical components, and telecommunications.

ASPECTS

The present disclosure pertains to and includes at least the following aspects.

Aspect 1. A polymer composition comprising: a matrix polymer component comprising a crystalline or semi-crystalline polymer; and 0.1 wt. % to 15 wt. %, based on the weight of the polymer composition, of a fibrillated fluoropolymer, a fibrillated fluoropolymer encapsulated by an encapsulating polymer, or a combination thereof.

Aspect 2. A polymer composition comprising: a matrix polymer component comprising a crystalline or semi-crystalline polymer; and about 0.1 wt. % to about 15 wt. %, based on the weight of the polymer composition, of a fibrillated fluoropolymer, a fibrillated fluoropolymer encapsulated by an encapsulating polymer, or a combination thereof.

Aspect 3. The polymer compositions of any of the preceding aspects, wherein the matrix polymer component comprises polybutylene terephthalate, polyethylene terephthalate, polypropylene, nylon, linear low-density polyethylene, low-density polyethylene, high density polyethylene, polytrimethylene terephthalate, polyethylene naphthalate, polybutylene naphthalate, or a combination thereof.

Aspect 4. A polymer composition consisting of: a matrix polymer component comprising a crystalline or semi-crystalline polymer; and 0.1 wt. % to 15 wt. %, based on the weight of the polymer composition, of a fibrillated fluoropolymer, a fibrillated fluoropolymer encapsulated by an encapsulating polymer, or a combination thereof.

Aspect 5. A polymer composition consisting of: a matrix polymer component comprising a crystalline or semi-crystalline polymer; and about 0.1 wt. % to about 15 wt. %, based on the weight of the polymer composition, of a fibrillated fluoropolymer, a fibrillated fluoropolymer encapsulated by an encapsulating polymer, or a combination thereof.

Aspect 6. The polymer compositions of any of the preceding aspects, wherein the matrix polymer component consists of polybutylene terephthalate, polyethylene terephthalate, polypropylene, nylon, linear low-density polyethylene, low-density polyethylene, high density polyethylene, polytrimethylene terephthalate, polyethylene naphthalate, polybutylene naphthalate, or a combination thereof.

Aspect 7. A polymer composition consisting essentially of: a matrix polymer component comprising a crystalline or semi-crystalline polymer; and 0.1 wt. % to 15 wt. %, based on the weight of the polymer composition, of a fibrillated fluoropolymer, a fibrillated fluoropolymer encapsulated by an encapsulating polymer, or a combination thereof.

Aspect 8. A polymer composition consisting essentially of: a matrix polymer component comprising a crystalline or semi-crystalline polymer; and about 0.1 wt. % to about 15 wt. %, based on the weight of the polymer composition, of a fibrillated fluoropolymer, a fibrillated fluoropolymer encapsulated by an encapsulating polymer, or a combination thereof.

Aspect 9. The polymer compositions of any of the preceding aspects, wherein the matrix polymer component consists essentially of polybutylene terephthalate, polyethylene terephthalate, polypropylene, nylon, linear low-density polyethylene, low-density polyethylene, high density polyethylene, polytrimethylene terephthalate, polyethylene naphthalate, polybutylene naphthalate, or a combination thereof.

Aspect 10. The polymer compositions of any of the preceding aspects, wherein the matrix polymer component comprises polybutylene terephthalate, polyethylene terephthalate, or polypropylene.

Aspect 11. The polymer composition of any of the preceding aspects, wherein the fluoropolymer comprises polytetrafluoroethylene, polyhexafluoropropylene, polyvinylidene fluoride, polychlorotrifluoroethylene, ethylene tetrafluoroethylene, fluorinated ethylene-propylene, polyvinyl fluoride, ethylene chlorotrifluoroethylene, or a combination thereof.

Aspect 12. The polymer composition of any of the preceding aspects, wherein the encapsulating polymer comprises a styrene-acrylonitrile copolymer, an acrylonitrile-butadiene-styrene copolymer, alpha-alkyl-styrene-acrylonitrile copolymer, an alpha-methylstyrene-acrylonitrile copolymer, a styrene-butadiene rubber, or a combination thereof.

Aspect 13. The polymer composition of any one of the preceding aspects, wherein the fluoropolymer is polytetrafluoroethylene.

Aspect 14. The polymer composition of any one of the preceding aspects, wherein the fluoropolymer encapsulated by an encapsulating polymer is styrene-acrylonitrile copolymer encapsulated polytetrafluoroethylene.

Aspect 15. The polymer composition of any one of the preceding aspects, wherein the matrix polymer component is polybutylene terephthalate.

Aspect 16. The polymer composition of any one of aspects 1 to 15, wherein the matrix polymer component is polyethylene terephthalate.

Aspect 17. The polymer composition of any one of aspects 1 to 15, wherein the matrix polymer component is polypropylene.

Aspect 18. The polymer composition of aspect 17, wherein the polypropylene is a random polymer, a co-polymer, or a homopolymer.

Aspect 19. The polymer composition of any one of the preceding aspects, comprising 1 wt. % to 10 wt. %, based on the weight of the polymer composition, of the fluoropolymer.

Aspect 20. The polymer composition of any one of the preceding aspects, comprising about 1 wt. % to about 10 wt. %, based on the weight of the polymer composition, of the fluoropolymer.

Aspect 21. The polymer composition of any one of the preceding aspects, having a complex viscosity, measured at a 0.1 rad/sec, of between 4500 Pa·s and 70,000 Pa·s, measured at a temperature of between 230° C. and 260° C.

Aspect 22. The polymer composition of any one of the preceding aspects, having a complex viscosity, measured at a 0.1 rad/sec, of between about 4500 Pa·s and about 70,000 Pa·s, measured at a temperature of between about 230° C. and about 260° C.

Aspect 23. The polymer composition of any one of the preceding aspects, having an extensional viscosity of between 11,000 and 90,000 Pa·s at a maximum henky strain of 2.0 at a strain rate of 1 $s^{-1}$, measured at a temperature of between 230° C. and 260° C.

Aspect 24. The polymer composition of any one of the preceding aspects, having an extensional viscosity of between about 11,000 and about 90,000 Pa·s at a maximum henky strain of 2.0 at a strain rate of 1 $s^{-1}$, measured at a temperature of between about 230° C. and about 260° C.

Aspect 25. The polymer composition of any one of the preceding aspects, having a tensile modulus of greater than 2450 MPa to 3000 MPa.

Aspect 26. The polymer composition of any one of the preceding aspects, having a tensile modulus of greater than about 2450 MPa to about 3000 MPa.

Aspect 27. The polymer composition of any one of the preceding aspects, having a notched impacted strength of greater than 3.5 $KJ/m^2$ to 10 $KJ/m^2$.

Aspect 28. The polymer composition of any one of the preceding aspects, having a notched impacted strength of greater than about 3.5 $KJ/m^2$ to about 10 $KJ/m^2$.

Aspect 29. An article comprising the composition of any one of the preceding aspects.

Aspect 30. The article of aspect 29, produced using a process comprising foaming, sheet forming, or pipe extrusion.

Aspect 31. A method comprising: subjecting a polymer composition of any one of aspects 1 to 22 to a process comprising foaming, sheet forming, or pipe extrusion.

Aspect 32. A method comprising: subjecting a polymer composition of any one of aspects 1 to 22 to a process consisting of foaming, sheet forming, or pipe extrusion.

Aspect 33. A method comprising: subjecting a polymer composition of any one of aspects 1 to 22 to a process consisting essentially of foaming, sheet forming, or pipe extrusion.

The following examples are provided to illustrate the compositions, processes, and properties of the present disclosure. The examples are merely illustrative and are not intended to limit the disclosure to the materials, conditions, or process parameters set forth therein.

EXAMPLES

Materials

PBT 315 (milled PBT) (BASF-GE Schwartzheide)
RAMAPET (milled, regular PET) (Indorama)
TSAN (SAN-encapsulated PTFE). TSAN is a 1:1 ratio of SAN and PTFE. (SABIC)
ALGOFLON DF210 (PTFE) (Solvay Solexis S.P.A.)
108MF10 (PP-copolymer) (SABIC)
670KH (PP-random) (SABIC)
520P (PP-homopolymer) (SABIC)

Example 1

Polypropylene (random, co-polymer, or homo-polymer) was compounded with varying amounts of TSAN (0.15 wt. % to 10 wt. %) and PTFE (0.15 wt. % to 5 wt. %) using a ZSK-25 twin-screw extruder (Krupp Werner and Pfleiderer, GmbH, Germany) at a screw speed of 300 rpm. The temperature of the extruder was set at approx. 50° C. for the feeding section and up to 230° C. in the melting zone by gradually increasing the temperature according to the profile along the length of the extruder: 50/70/120/190/220/230/230/230/230/230/230/230° C.

Example 2

Polybutylene terephthalate was compounded with varying amounts of TSAN (0.15 wt. % to 10 wt. %) and PTFE (0.15 wt. % to 5 wt. %) using a ZSK-25 twin-screw extruder (Krupp Werner and Pfleiderer, GmbH, Germany) at a screw speed of 300 rpm. The temperature of the extruder was set at approx. 40° C. for the feeding section and up to 270° C. in the melting zone, by gradually increasing the temperature according to the profile along the length of the extruder: 40-70-190-240-270-270-270-270° C.

Example 3

Polyethylene terephthalate was compounded with varying amounts of TSAN (0.15 wt. % to 10 wt. %) and PTFE (0.15 wt. % to 5 wt. %) using a ZSK-25 twin-screw extruder (Krupp Werner and Pfleiderer, GmbH, Germany) at a screw speed of 300 rpm. The temperature of the extruder was set at approx. 40° C. for the feeding section and up to 280° C. in the melting zone, by gradually increasing the temperature according to the profile along the length of the extruder: 40-70-190-240-270-270-270-270° C.

Example 4

Pipe extrusion of PBT with 1% PTFE was done at a melt temperature of about 266° C., with a screw speed of 21 revolutions per minute (rpm) with a pull speed of 2.8 meters per minute (m/min) and diameter of 19.6 millimeters (mm). Pipe extrusion was not possible using PBT without PTFE.

Example 5

Foaming was carried out at 200° C. using a chemical blowing agent, e.g., isobutane, on samples of PBT with PTFE and PBT without PTFE. The PBT without PTFE sample had poor surface finish and was found to be brittle. The PBT with 1% PTFE samples showed very good surface finish with good mechanical properties, e.g., ductility.

Example 6

Figure 2:
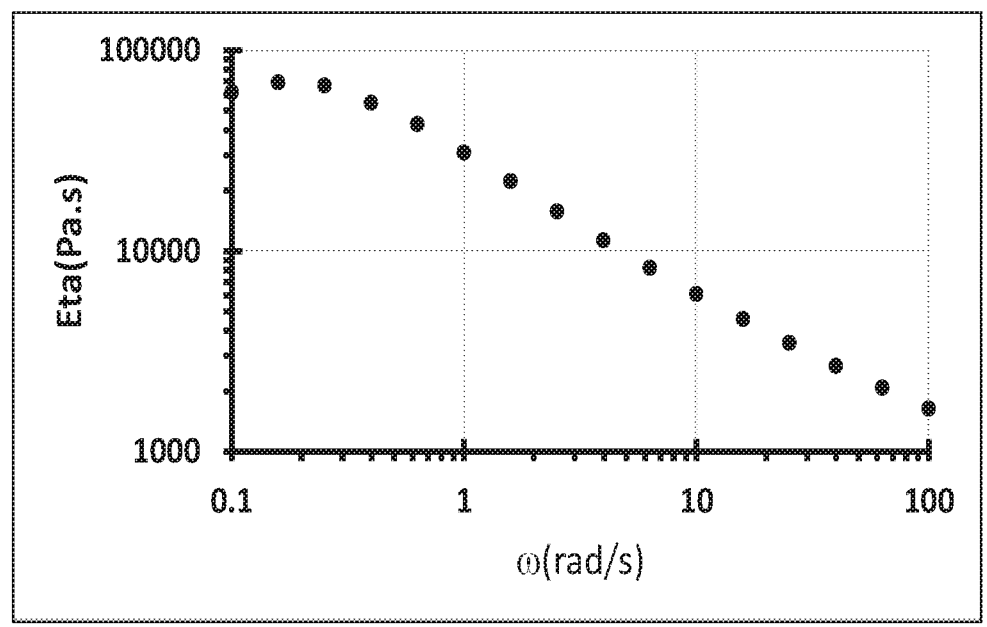
FIG. 2 depicts complex viscosity for embodiments of the disclosure incorporating PET with 1 wt. % PTFE.

Complex viscosity [Eta*, $\eta^*$ at frequency in units of radians per second (rad/s)] for embodiments of the disclosure were conducted at 250° C. using ISO 6721-10:1999. See, e.g., FIGS. 1 and 2. As shown in FIG. 1, varying the amount of PTFE present in the PBT samples affects the viscosity. The addition of PTFE to the PBT polymer increased the viscosity of the PBT sample. At 0.1 rad/sec, samples having PTFE (at 2.5% and 5%) exhibited a much greater complex viscosity. The 2.5% and 5% PTFE samples exhibited a complex viscosity of greater than 1000 Pa·s, and greater than 4500 Pa·s, while the sample at 0% PTFE exhibited a complex viscosity of well below 1000 Pa·s throughout the range of frequencies observed, between 0.1 rad/s and 1000 rad/s. A similar trend may be observed for PET based samples as shown in FIG. 2. The complex viscosity of a PET sample having 1% PTFE also exhibited a complex viscosity greater than 4500 Pa·s at 0.1 rad/s.

Example 7

Figure 3:
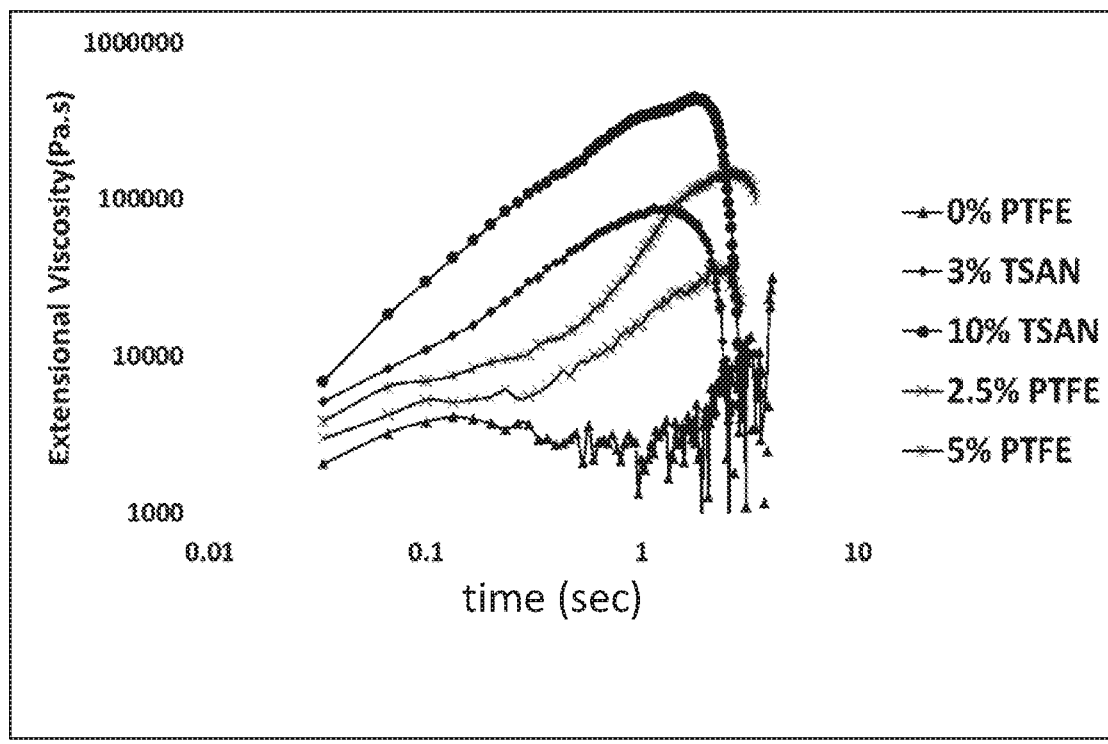
FIG. 3 depicts extensional viscosity for embodiments of the disclosure incorporating PBT.

Extensional viscosity [$\eta^*$ at frequency in units of rad/s] for embodiments of the disclosure was measured using the SER (Sentmanat Extension Rheometer) Universal Testing Platform (Xpansion Instruments for use on the ARES-G2). The samples used in this test were 10 mm×20 mm×0.5 mm. The tests were conducted at 250° C. for PBT samples, at 260° C. for PET samples, and at 230° C. for PP samples, using a constant strain rate of 1 $s^{-1}$. The data of extensional viscosity vs. time was recorded. See FIGS. 3 through 7. In FIG. 3, PET samples included samples included 0% PTFE, 3% TSAN, 10% TSAN, 2.5% PTFE, and 5% PTFE. These examples demonstrate the formation of PTFE fibrils oriented under extrusion and injection molding and the effect of the PTFE on the polymer viscosity. The curve corresponding to 0% PTFE exhibited the lowest extensional viscosity values. Increasing amounts of PTFE corresponded to an increase in the viscosity as can be seen in the curves for 2.5% and 5% PTFE (the curves adjacent the lowest curve corresponding to 0% PTFE). A further enhancement of viscosity is observed in the samples containing TSAN. This may be attributed to PTFE not being miscible with the molten polymer in-spite of the high polarity of PTFE due to the high crystalline nature of PTFE (>90%). The samples containing TSAN at 3% and 10% tend to exhibit greater viscosity, particularly between 0.01 and 1 seconds.

Figure 4:
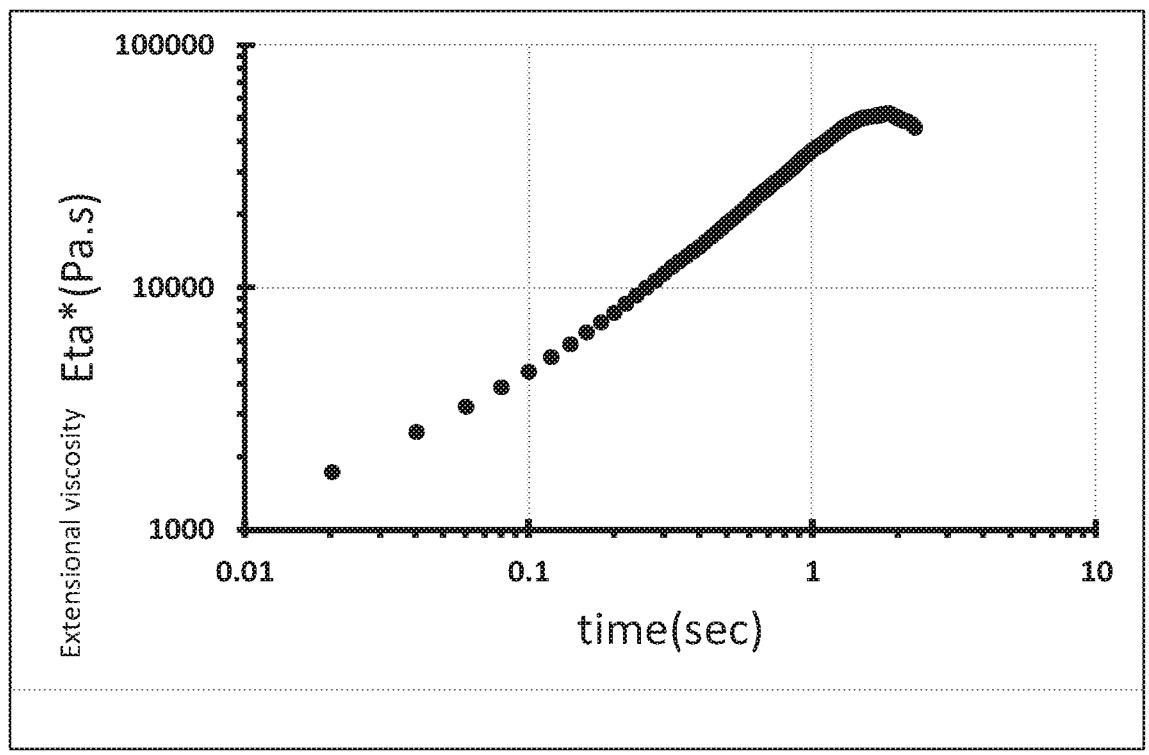
FIG. 4 depicts extensional viscosity for embodiments of the disclosure incorporating PET with 1% PTFE.
Figure 5:
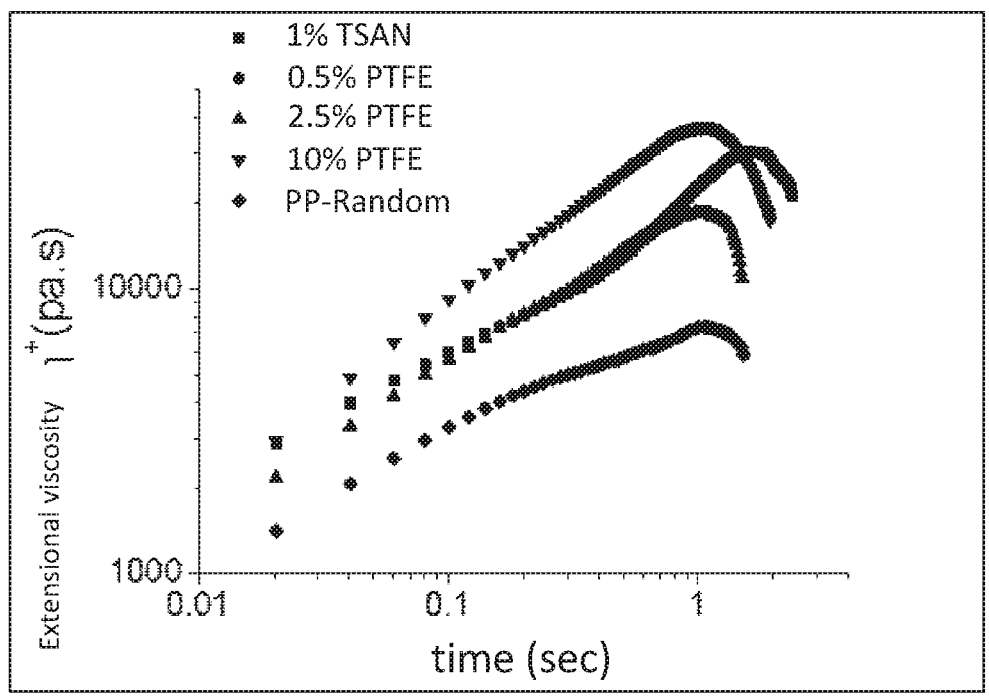
FIG. 5 depicts extensional viscosity for embodiments of the disclosure incorporating PP (random).
Figure 6:
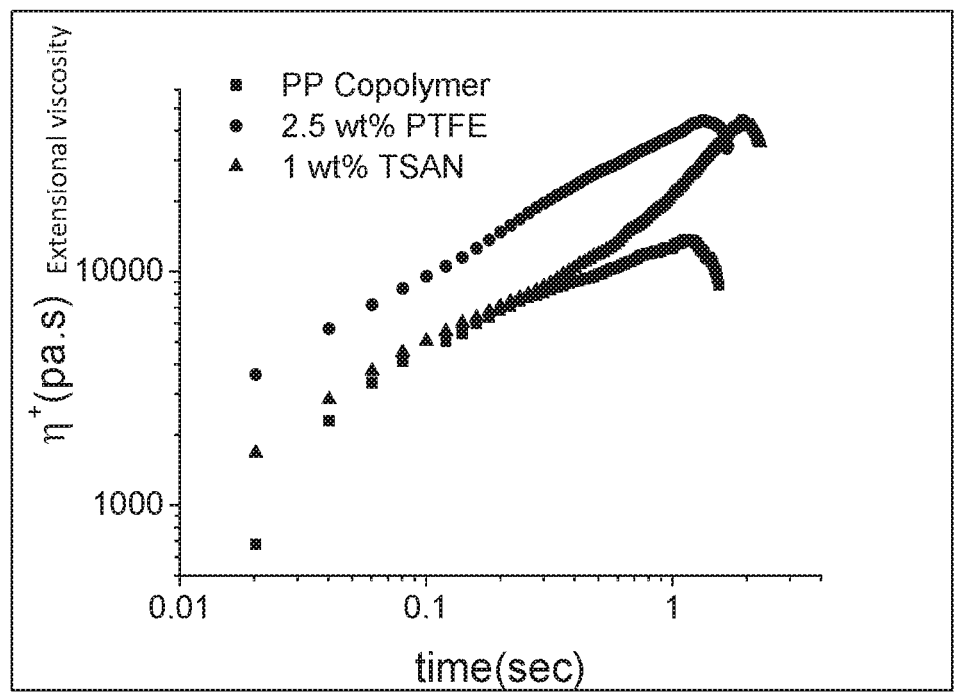
FIG. 6 depicts extensional viscosity for embodiments of the disclosure incorporating PP (copolymer).
Figure 7:
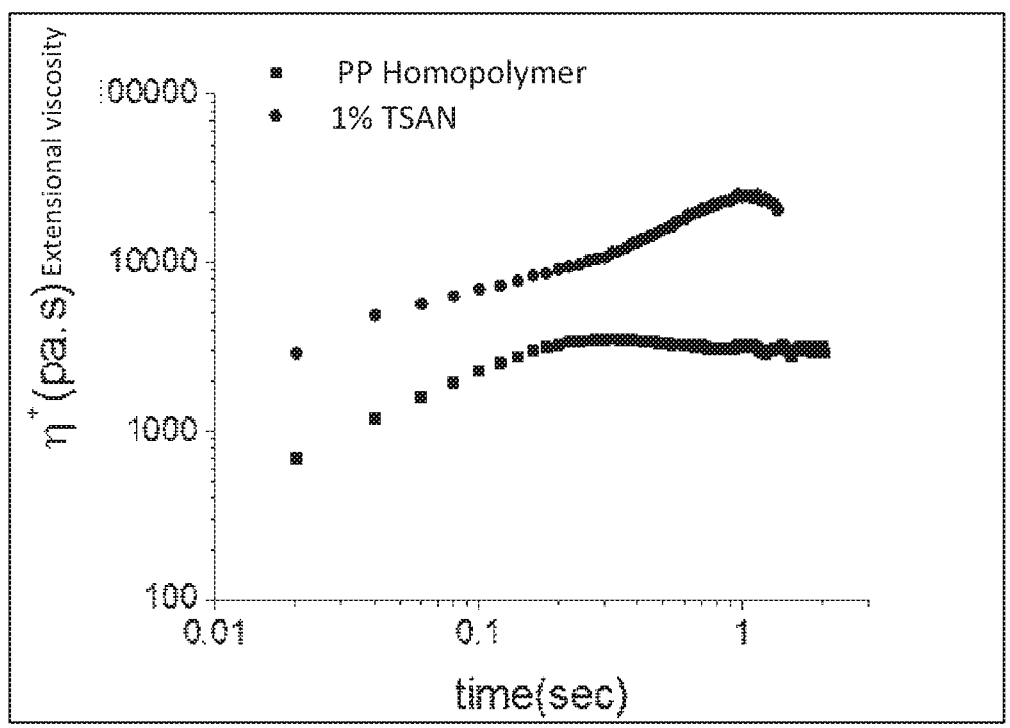
FIG. 7 depicts extensional viscosity for embodiments of the disclosure incorporating PP (homopolymer).

FIG. 4 shows the extensional viscosity for a PET sample at 1% PTFE. As shown, the viscosity of the polymer improves over time under stress. FIGS. 5, 6, and 7 show the effect of the addition of PTFE and TSAN in polypropylene polymer samples. In FIG. 5, the curves for a) the random polypropylene polymer (PP) neat and b) the random PP polymer having 0.5% PTFE, overlap and have the lowest extensional viscosity. Additional amounts of PTFE (corresponding to curve with 2.5% PTFE) and TSAN (1%) increase the extensional viscosity of the random polypropylene polymer. The random PP polymer exhibiting the greatest extensional viscosity had 10% PTFE. Similar trends are apparent in FIGS. 6 and 7 corresponding to PP copolymer and homopolymer, respectively. In FIG. 6, the PP copolymer exhibited the lowest extensional viscosity. The inclusion of 1 wt. % TSAN improved the extensional viscosity (middle curve). At 2.5% PTFE, the PP copolymer exhibited the greatest extensional viscosity. For the PP Homopolymer of FIG. 7, the inclusion of 1% TSAN improved the extensional viscosity to greater than 10000 Pa·s.

Example 8

Figure 8:
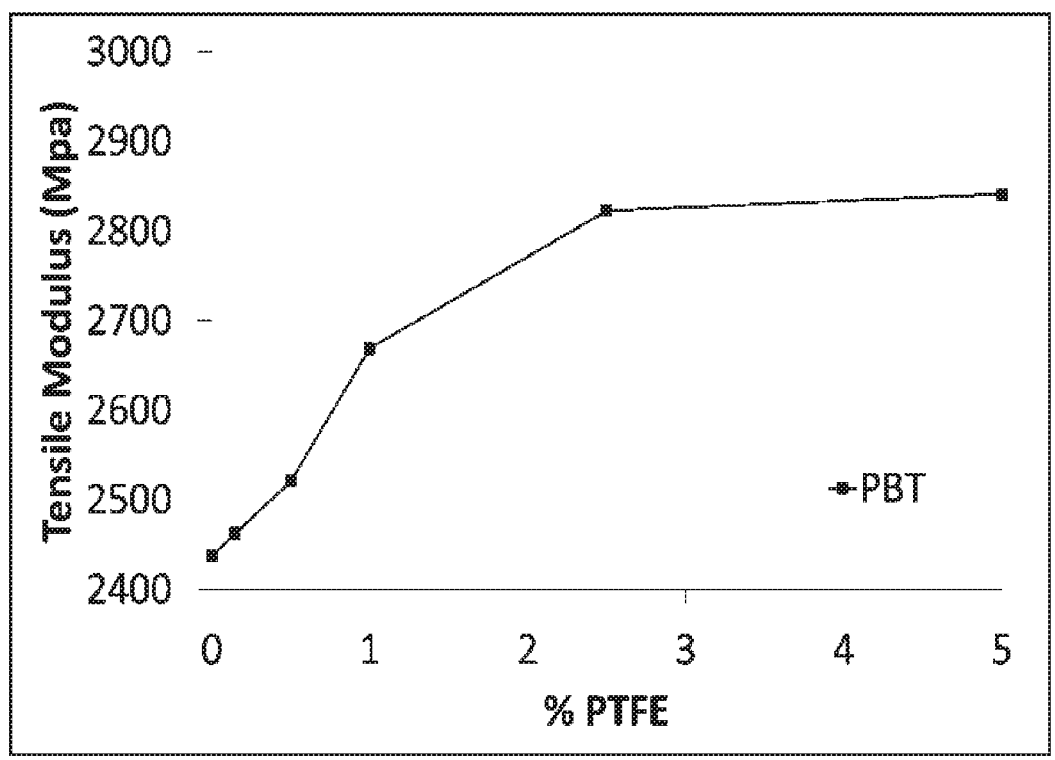
FIG. 8 depicts tensile modulus for embodiments of the disclosure incorporating PBT.

Tensile modulus for embodiments of the disclosure was measured according to ISO 527. See, e.g., FIG. 8. As shown, the tensile modulus increased with increasing amounts of PTFE in the PBT polymer.

Example 9

Figure 9:
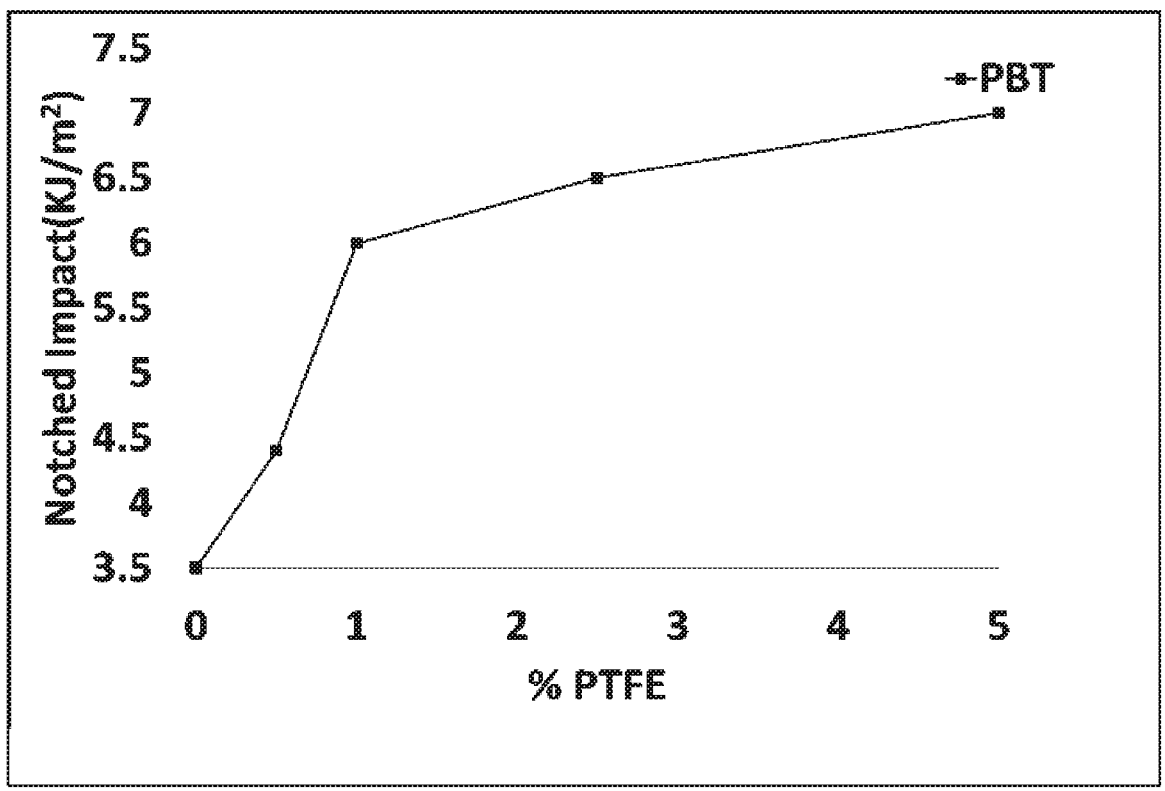
FIG. 9 depicts notched impact strength for embodiments of the disclosure incorporating PBT.

Notched impact strength for embodiments of the disclosure was measured according to ISO 180. See, e.g., FIG. 9. Notched impact strength increased with increasing amounts of PTFE in the PBT polymer.

What is claimed:

1. A polymer composition consisting of:
a matrix polymer component consisting of polypropylene, nylon, linear low-density polyethylene, low-density polyethylene, high density polyethylene, or a combination thereof; and
0.1 wt. % to 15 wt. %, based on the weight of the polymer composition, of a styrene-acrylonitrile copolymer encapsulated fibrillated polytetrafluoroethylene,
wherein the composition has a complex viscosity, measured at a 0.1 rad/sec, of between 4500 Pa·s and 70,000 Pa·s, measured at a temperature of between 230° C. and 260° C., and
wherein the composition has an extensional viscosity of between 11,000 and 90,000 Pa·s at a maximum Hencky strain of 2.0 at a strain rate of 1 s·1, measured at a temperature of between 230° C. and 260° C.

2. The polymer composition of claim 1, wherein the matrix polymer component consists of polypropylene.

3. The polymer composition of claim 2, wherein the polypropylene is a random polymer, a co-polymer, or a homopolymer.

4. The polymer composition of claim 1, comprising 1 wt. % to 10 wt. %, based on the weight of the polymer composition, of the styrene-acrylonitrile copolymer encapsulated polytetrafluoroethylene.

5. The polymer composition of claim 1, having a tensile modulus of greater than 2450 MPa to 3000 MPa.

6. The polymer composition of claim 1, having a notched impacted strength of greater than 3.5 KJ/m2 to 10 KJ/m2.

7. An article consisting of the composition of claim 1.

8. The article of claim 7, produced using a process comprising foaming, sheet forming, or pipe extrusion.

9. A method comprising subjecting a polymer composition of claim 1 to a process comprising foaming, sheet forming, or pipe extrusion.

10. The polymer composition of claim 1 wherein the fibrillated polytetrafluoroethylene is characterized by a DSC peak around 330° C.

11. A polymer composition consisting of:
a matrix polymer component consisting of polypropylene, nylon, linear low-density polyethylene, low-density polyethylene, high density polyethylene, or a combination thereof;
0.1 wt. % to 15 wt. %, based on the weight of the polymer composition, of a styrene-acrylonitrile copolymer encapsulated fibrillated polytetrafluoroethylene; and
a colorant consisting of a dye,
wherein the composition has a complex viscosity, measured at a 0.1 rad/sec, of between 4500 Pa·s and 70,000 Pa·s, measured at a temperature of between 230° C. and 260° C., and
wherein the composition has an extensional viscosity of between 11,000 and 90,000 Pa·s at a maximum Hencky strain of 2.0 at a strain rate of 1 s·1, measured at a temperature of between 230° C. and 260° C.

12. The polymer composition of claim 11, wherein the matrix polymer component consists of polypropylene.

13. The polymer composition of claim 12, wherein the polypropylene is a random polymer, a co-polymer, or a homopolymer.

14. The polymer composition of claim 11, comprising 1 wt. % to 10 wt. %, based on the weight of the polymer composition, of the styrene-acrylonitrile copolymer encapsulated polytetrafluoroethylene.

15. The polymer composition of claim 11, having a tensile modulus of greater than 2450 MPa to 3000 MPa.

16. The polymer composition of claim 11, having a notched impacted strength of greater than 3.5 KJ/m2 to 10 KJ/m2.

17. An article consisting of the composition of claim 11, wherein the article is produced using a process comprising foaming, sheet forming, or pipe extrusion.

18. A method comprising subjecting a polymer composition of claim 11 to a process comprising foaming, sheet forming, or pipe extrusion.

19. The polymer composition of claim 11, wherein the dye consists of at least one of: coumarin 460 (blue); coumarin 6 (green); nile red; lanthanide complex; hydrocarbon or substituted hydrocarbon dye; polycyclic aromatic hydrocarbon dye; oxazole dye; oxadiazole dye; aryl- or heteroaryl-substituted poly (C2-8) olefin dye; carbocyanine dye; indanthrone dye; phthalocyanine dye; oxazine dye; carbostyryl dye; napthalenetetracarboxylic acid dye; porphyrin dye; bis(styryl)biphenyl dye; acridine dye; anthraquinone dye; cyanine dye; methine dye; arylmethane dye; azo dye; indigoid dye; thioindigoid dye; diazonium dye; nitro dye; quinone imine dye; aminoketone dye; tetrazolium dye; thiazole dye; perylene dye; perinone dye; bis-benzoxazolylthiophene (BBOT); triarylmethane dye; xanthene dye; thioxanthene dye; naphthalimide dye; lactone dye; fluorophore; 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methy 1-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; or coronene.

20. The polymer composition of claim 11 wherein the fibrillated polytetrafluoroethylene is characterized by a DSC peak around 330° C.

\* \* \* \* \*